US008737191B2

(12) United States Patent
Freda et al.

(10) Patent No.: US 8,737,191 B2
(45) Date of Patent: May 27, 2014

(54) BLIND TIMING SYNCHRONIZATION AND LOW COMPLEXITY CHANNEL ESTIMATION IN ACO-OFDM SYSTEMS

(75) Inventors: Martino Freda, Laval (CA); Alpaslan Y. Demir, East Meadow, NY (US); Joseph M. Murray, Schwenksville, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 561 days.

(21) Appl. No.: 13/035,122

(22) Filed: Feb. 25, 2011

(65) Prior Publication Data

US 2012/0057872 A1 Mar. 8, 2012

Related U.S. Application Data

(60) Provisional application No. 61/308,181, filed on Feb. 25, 2010, provisional application No. 61/308,092, filed on Feb. 25, 2010, provisional application No. 61/347,616, filed on May 24, 2010.

(51) Int. Cl.
*H04J 11/00* (2006.01)
(52) U.S. Cl.
CPC .................................. *H04J 11/0086* (2013.01)
USPC .............. 370/208; 370/344; 370/350; 398/76
(58) Field of Classification Search
USPC ............................. 370/208, 344, 350; 398/76
See application file for complete search history.

(56) References Cited

U.S. PATENT DOCUMENTS

2005/0137854 A1* 6/2005 Cancedda et al. ................. 704/9
2007/0263570 A1* 11/2007 Alapuranen et al. .......... 370/337
2009/0304120 A1* 12/2009 Agrawal et al. ............... 375/340

OTHER PUBLICATIONS

Transmitter and Receiver Methods for Improving Asymmetrically-Clipped Optical OFDM, Wilson et al., IEEE Transactions on Wireless Communications, vol. 8, No. 9, Sep. 2009, p. 4561-4567.*
Armstrong et al., "Comparison of Asymmetrically Clipped Optical OFDM and DC-Biased Optical of DM in AWGN", IEEE, Communications Letters, May 2008, 12(5), 343-345.
Armstrong et al., "Performance of Asymmetrically Clipped Optical OFDM in AWGN for an Intensity Modulated Direct Detection System", Global Telecommunications Conference, GLOBECOM, Nov. 2006, 1-5.
Armstrong et al., "Power Efficient Optical OFDM", Electronics Letters, Mar. 16, 2006, 42(6), 370-372.

(Continued)

*Primary Examiner* — Wanda Z Russell
(74) *Attorney, Agent, or Firm* — Condo Roccia Koptiw LLP

(57) ABSTRACT

A wireless transmit/receive unit (WTRU) that may receive an asymmetrically clipped optical orthogonal frequency-division multiplexing (ACO-OFDM) signal is disclosed. The ACO-OFDM signal may include an ACO-OFDM symbol and the ACO-OFDM signal may be generated with or without a pilot or training data. Where the ACO-OFDM signal may not include a pilot or training data, the WTRU may determine a correlation minimum between a first part of N samples of the ACO-OFDM symbol and a second part of N samples of the ACO-OFDM symbol. The correlation minimum may indicate an estimated boundary of the ACO-OFDM symbol which may provide the WTRU with timing synchronization information. Where the ACO-OFDM signal may include one or more ACO-OFDM pilot symbols on one or more pilot subcarriers, the WTRU may interpret an amount of training data included in the one or more ACO-OFDM pilot symbols that may provide information for channel estimation.

7 Claims, 23 Drawing Sheets

(56) References Cited

OTHER PUBLICATIONS

Freda et al., "Joint Channel Estimation and Synchronization for OFDM Systems", Vehicular Technology Conference, VTC2004—Fall, Sep. 26-29, 2004, 3, 1673-1677.

Freda et al., "Low-complexity blind timing synchronization for ACO-OFDM-based optical wireless communications", IEEE, GLOBECOM Workshops (GC Workshops), Dec. 6, 2010, 1031-1036.

Gagliardi et al., "Optical Communications: Second Edition", John Wiley & Sons Inc., Feb. 1995, 368 pages.

Guo et al., "Performance Comparison of Blind Symbol Timing Estimation in Cyclic Prefixed OFDM Systems", IEEE, TENCON, Nov. 21-24, 2005, 1126-1130.

Tian et al., "A Novel Timing Synchronization Method for ACO-OFDM-Based Optical Wireless Communications", IEEE Transactions on Wireless Communications, Dec. 2008, 7(12), 4958-4967.

Van De Beek et al., "ML estimation of time and frequency offset in OFDM systems", Signal Processing, IEEE, Jul. 1997, 45(7), 1800-1805.

Wilson, S. K., "Non-pilot based synchronization for ACO-OFDM", Conference Record of the Forty-Third Asilomar Conference on Signals, Systems and Computers, IEEE, Nov. 1, 2009, 1631-1635.

\* cited by examiner

BLIND TIMING SYNCHRONIZATION AND LOW COMPLEXITY CHANNEL ESTIMATION IN ACO-OFDM SYSTEMS

CROSS REFERENCE TO RELATED APPLICATIONS

This application claims the benefit of U.S. Provisional Application No. 61/308,181, filed Feb. 25, 2010, titled "METHOD AND APPARATUS FOR A BLIND TIMING SYNCHRONIZATION ALGORITHM FOR WIRELESS COMMUNICATIONS USING ACO-OFDM", U.S. Provisional Application No. 61/308,092, filed Feb. 25, 2010, titled "METHOD AND APPARATUS FOR LOW COMPLEXITY CHANNEL ESTIMATION IN ACO-OFDM SYSTEMS", and U.S. Provisional Application No. 61/347,616, filed May 24, 2010, titled "METHOD AND APPARATUS FOR A BLIND TIMING SYNCHRONIZATION ALGORITHM FOR WIRELESS COMMUNICATIONS USING ACO-OFDM", the contents of all three applications are hereby incorporated by reference herein in their respective entirety, for all purposes.

BACKGROUND

In non-coherent wireless communications, the phase of the transmitted electrical field may not be used to carry information. Instead, properties such as frequency, amplitude, or intensity are used by the transmitter to send information. This type of communication finds applications in areas where modulation of the phase may not be feasible. This could occur for several reasons. For instance, some communication links may suffer from severe degradation due to the existence of fast multipath fading during transmission. This degradation caused by large delays in the multipaths can completely destroy phase information at the receiver, making coherent communication impossible. One example of this is underwater communications using radio frequency (RF) or other spectrum. Underwater communication may suffer from severe delay and Doppler spreading effects: the delay caused by reflections from objects such as rocks and the Doppler spreading is caused by waves. Non-coherent modulation schemes such as frequency shift keying (FSK) have traditionally been used in this type of application.

Another use for non-coherent wireless communication is in the area of optical wireless communication. The need for higher data rates in wireless communication systems and the scarcity of available unlicensed bandwidth have fueled research into the use of spectrum outside of the RF band for wireless communication. Optical wireless communication such as UV, visible light, and infrared may provide a potential for very large unlicensed bandwidth that will satisfy the bandwidth needs for current and future wireless communication applications. Typically, first generation optical wireless communication systems may need to be non-coherent. This is due to the complexity and cost of coherent optical modulators capable of modifying the phase of the optical radiation, and also due to the difficulty of recovering phase information at the receiver due to large scattering and reflections exhibited by optical radiation in the presence of air molecules and aerosols.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

Embodiments contemplate a wireless transmit/receive unit (WTRU) that may be configured at least in part to generate an asymmetrically clipped optical orthogonal frequency-division multiplexing (ACO-OFDM) signal. The ACO-OFDM signal may include one or more ACO-OFDM symbols and the ACO-OFDM signal may be generated without a pilot or a training sequence. The WTRU may transmit the ACO-OFDM signal and the transmission may be made in time domain.

Embodiments contemplate that a function may be applied to the ACO-OFDM signal in frequency domain before the ACO-OFDM signal is rendered into the time domain. The function may set one or more even frequency domain samples of the one or more ACO-OFDM symbols to zero. The function may be an even sample zero insert.

Embodiments contemplate that the respective one or more ACO-OFDM symbols may be extended by a number of dummy samples. The number of dummy samples may be one or two, and the one or two dummy samples may be inserted into the respective one or more ACO-OFDM symbols before a cyclic prefix may be inserted into the respective one or more ACO-OFDM symbols. The one or two dummy samples may be adjacent to the cyclic prefix in the one or more respective ACO-OFDM symbols. Alternative embodiments contemplate that the number of dummy samples may be at least four which may be inserted into the respective one or more ACO-OFDM symbols at designated locations.

Embodiments contemplate a wireless transmit/receive unit (WTRU) that may be configured to receive an asymmetrically clipped optical orthogonal frequency-division multiplexing (ACO-OFDM) signal. The ACO-OFDM signal may include one or more ACO-OFDM symbols and the ACO-OFDM signal may be generated without a pilot or a training sequence. The WTRU may be further configured to determine a correlation between a first block of N/2 samples (first N/2 samples) of the one or more ACO-OFDM symbols and a second block of N/2 samples (second N/2 samples) of the one or more ACO-OFDM symbols. Embodiments contemplate that the first N/2 samples and the second N/2 samples may represent a first block set of N/2 samples where N may be an integer representing a number of samples of the one or more ACO-OFDM symbols.

Embodiments contemplate that the correlation may determine that the first block set of N/2 samples may include an estimated boundary of the one or more ACO-OFDM symbols upon the detection of a minimum between the first N/2 samples and the second N/2 samples. Embodiments contemplate that the estimated boundary of the one or more ACO-OFDM symbols may provide the WTRU with timing synchronization information.

Embodiments contemplate a wireless transmit/receive unit (WTRU) that may be configured to receive an asymmetrically clipped optical orthogonal frequency-division multiplexing (ACO-OFDM) signal, where the ACO-OFDM signal may include one or more ACO-OFDM pilot symbols on one or more pilot subcarriers. The WTRU may also be configured to interpret an amount of training data that may be included in the one or more ACO-OFDM pilot symbols. The training data may provide information for channel estimation.

Embodiments contemplate that the WTRU may be configured to request an additional amount of training data upon a condition that at least one of a quality of a data link may drop below a first threshold, or a channel change speed may rise above a second threshold. Embodiments also contemplate that the WTRU may request a smaller amount of training data upon a condition that at least one of the quality of the data link may rise above a third threshold or the channel change speed may drop below a fourth threshold.

Embodiments contemplate that the WTRU may be configured to utilize a physical lawyer automatic repeat request (ARQ) mechanism to implement either the request for an additional amount of training data or the request for a smaller amount of training data. The ARQ mechanism may utilize one or more of an acknowledgment (ACK) frame and one or more of a negative acknowledgement (NACK) frame.

Embodiments contemplate blind timing synchronization for orthogonal frequency-division multiplexing (OFDM), which may be tailored to the asymmetrically-clipped optical-OFDM (ACO-OFDM) waveform.

Embodiments contemplate channel estimation customized to an asymmetrically-clipped optical orthogonal frequency division multiplexing (ACO-OFDM) communication.

BRIEF DESCRIPTION OF THE DRAWINGS

A more detailed understanding may be had from the following description, given by way of example in conjunction with the accompanying drawings wherein.

DETAILED DESCRIPTION OF ILLUSTRATIVE EMBODIMENTS

Figure 1A:
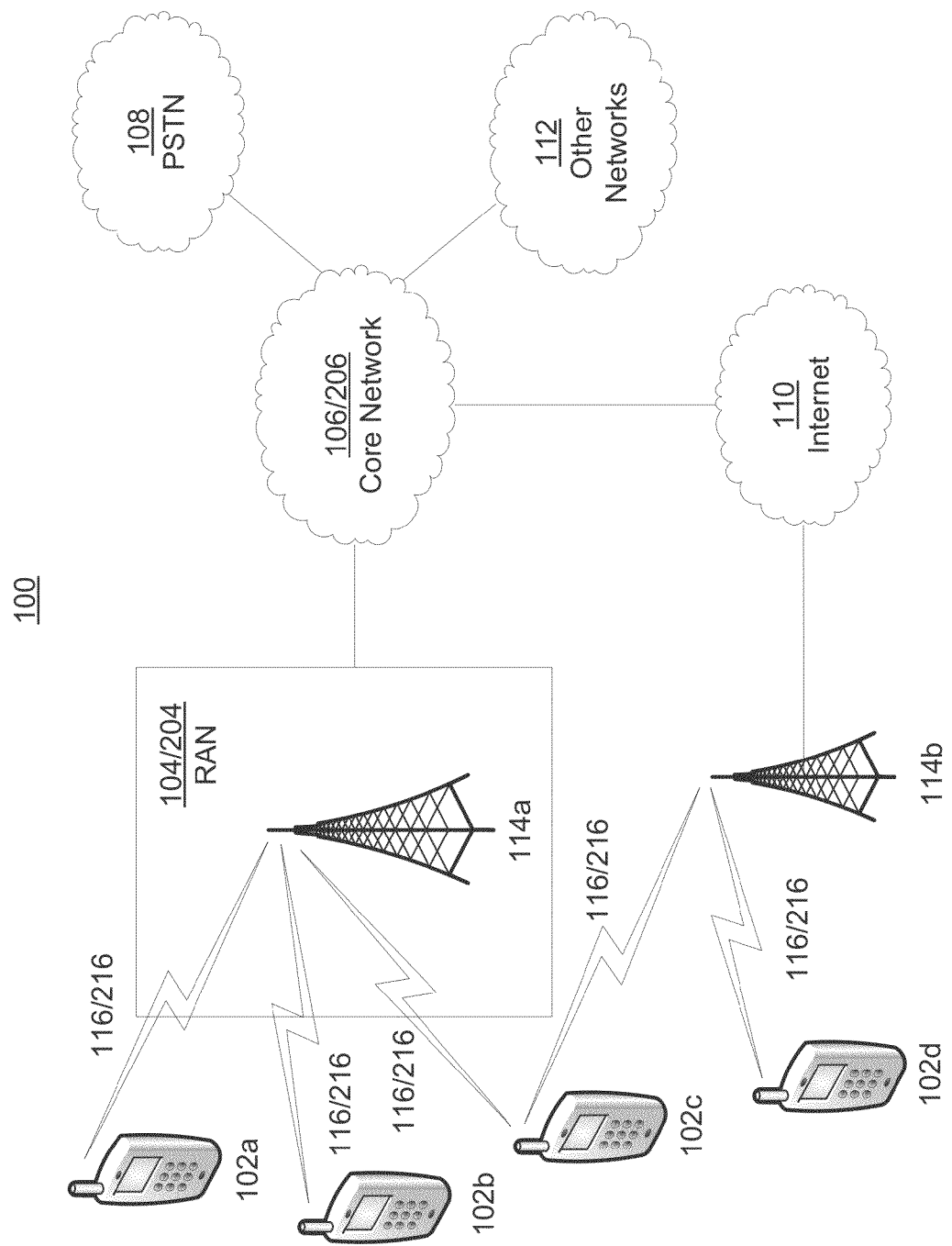
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104/204, a core network 106/206, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/206, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/204, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, e.g., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116/216, which may be any suitable wireless communication link (e.g., radio frequency (RF), microwave, infrared (IR), ultraviolet (UV), visible light, etc.). The air interface 116/216 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/204 and the WTRUs 102a, 102b, 102c may implement a radio technology such as Universal Mobile Telecommunications System (UMTS) Terrestrial Radio Access (UTRA), which may establish the air interface 116/216 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (e.g., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/206.

The RAN 104/204 may be in communication with the core network 106/206, which may be any type of network configured to provide voice, data, applications, and/or voice over internet protocol (VoIP) services to one or more of the WTRUs 102a, 102b, 102c, 102d. For example, the core network 106/206 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/204 and/or the core network 106/206 may be in direct or indirect communication with other RANs that employ the same RAT as the RAN 104/204 or a different RAT. For example, in addition to being connected to the RAN 104/204, which may be utilizing an E-UTRA radio technology, the core network 106/206 may also be in communication with another RAN (not shown) employing a GSM radio technology.

The core network 106/206 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104/204 or a different RAT.

Some or all of the WTRUs 102a, 102b, 102c, 102d in the communications system 100 may include multi-mode capabilities, e.g., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
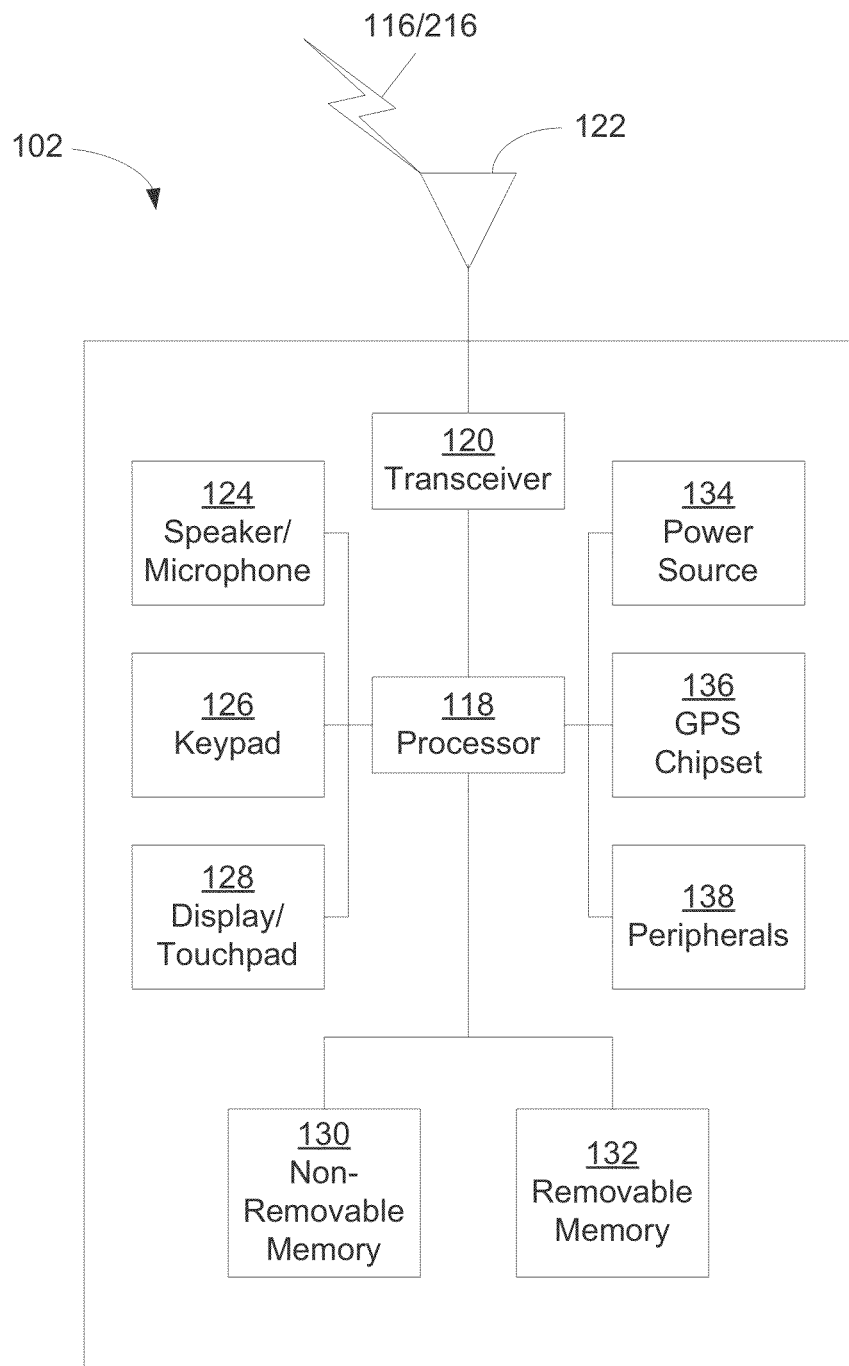
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116/216. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116/216.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116/216 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
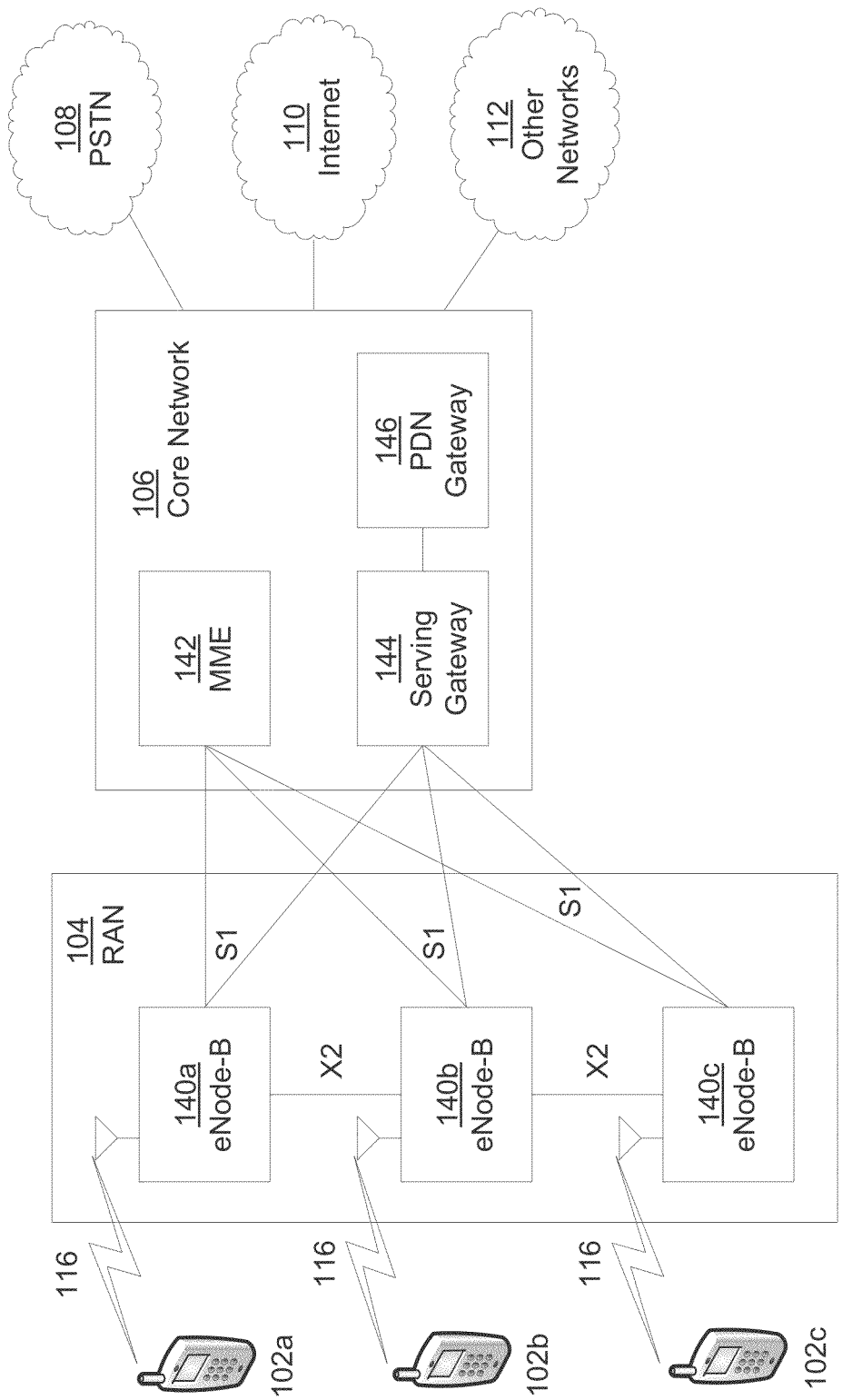
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, and/or 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, and/or 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The core network 106 may facilitate communications with other networks. For example, the core network 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102*a*, 102*b*, 102*c* with access to the networks 112, which may include other wired or wireless networks that are owned and/or operated by other service providers.

Figure 1D:
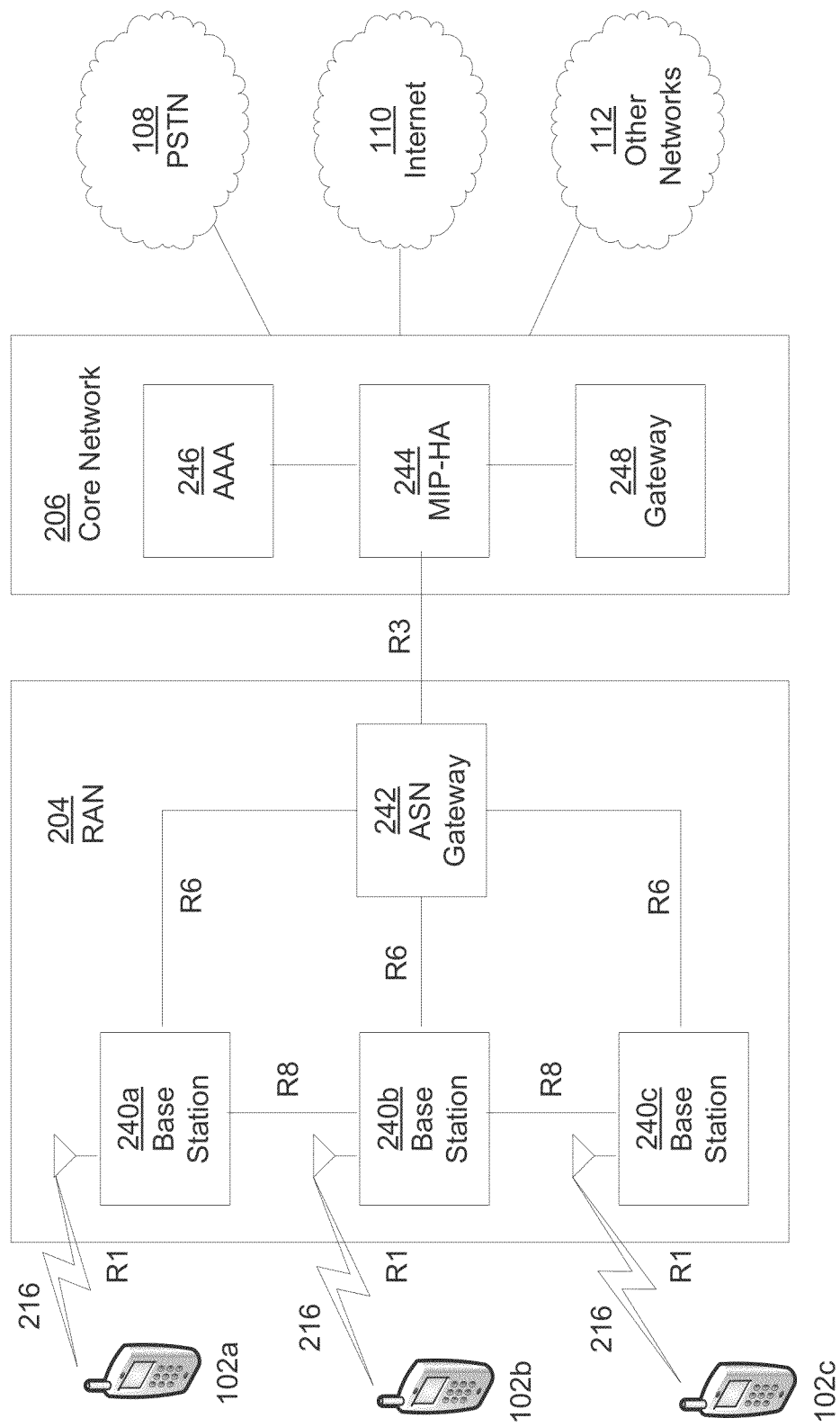
FIG. 1D is a system diagram of an example radio access network and an example core network that may be used within the communications system illustrated in FIG. 1A.

FIG. 1D is a system diagram of the RAN 204 and the core network 206 according to an embodiment. The RAN 204 may be an access service network (ASN) that employs IEEE 802.16 radio technology to communicate with the WTRUs 102*a*, 102*b*, 102*c* over the air interface 216. As will be further discussed below, the communication links between the different functional entities of the WTRUs 102*a*, 102*b*, 102*c*, the RAN 204, and the core network 206 may be defined as reference points.

As shown in FIG. 1D, the RAN 204 may include base stations 240*a*, 240*b*, 240*c*, and an ASN gateway 242, though it will be appreciated that the RAN 204 may include any number of base stations and ASN gateways while remaining consistent with an embodiment. The base stations 240*a*, 240*b*, 240*c* may each be associated with a particular cell (not shown) in the RAN 204 and may each include one or more transceivers for communicating with the WTRUs 102*a*, 102*b*, 102*c* over the air interface 216. In one embodiment, the base stations 240*a*, 240*b*, 240*c* may implement MIMO technology. Thus, the base station 240*a*, for example, may use multiple antennas to transmit wireless signals to, and receive wireless signals from, the WTRU 102*a*. The base stations 240*a*, 240*b*, 240*c* may also provide mobility management functions, such as handoff triggering, tunnel establishment, radio resource management, traffic classification, quality of service (QoS) policy enforcement, and the like. The ASN gateway 242 may serve as a traffic aggregation point and may be responsible for paging, caching of subscriber profiles, routing to the core network 206, and the like.

The air interface 216 between the WTRUs 102*a*, 102*b*, 102*c* and the RAN 204 may be defined as an R1 reference point that implements the IEEE 802.16 specification. In addition, each of the WTRUs 102*a*, 102*b*, and 102*c* may establish a logical interface (not shown) with the core network 206. The logical interface between the WTRUs 102*a*, 102*b*, 102*c* and the core network 206 may be defined as an R2 reference point, which may be used for authentication, authorization, IP host configuration management, and/or mobility management.

The communication link between each of the base stations 240*a*, 240*b*, 240*c* may be defined as an R8 reference point that includes protocols for facilitating WTRU handovers and the transfer of data between base stations. The communication link between the base stations 240*a*, 240*b*, 240*c* and the ASN gateway 242 may be defined as an R6 reference point. The R6 reference point may include protocols for facilitating mobility management based on mobility events associated with each of the WTRUs 102*a*, 102*b*, 100*c*.

As shown in FIG. 1D, the RAN 204 may be connected to the core network 206. The communication link between the RAN 204 and the core network 206 may defined as an R3 reference point that includes protocols for facilitating data transfer and mobility management capabilities, for example. The core network 206 may include a mobile IP home agent (MIP-HA) 244, an authentication, authorization, accounting (AAA) server 246, and a gateway 248. While each of the foregoing elements are depicted as part of the core network 206, it will be appreciated that any one of these elements may be owned and/or operated by an entity other than the core network operator.

The MIP-HA 244 may be responsible for IP address management, and may enable the WTRUs 102*a*, 102*b*, 102*c* to roam between different ASNs and/or different core networks. The MIP-HA 244 may provide the WTRUs 102*a*, 102*b*, 102*c* with access to packet-switched networks, such as the Internet 110, to facilitate communications between the WTRUs 102*a*, 102*b*, 102*c* and IP-enabled devices. The AAA server 246 may be responsible for user authentication and for supporting user services. The gateway 248 may facilitate interworking with other networks. For example, the gateway 248 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. In addition, the gateway 248 may provide the WTRUs 102*a*, 102*b*, 102*c* with access to the networks 112, which may include other wired or wireless networks that are owned and/or operated by other service providers.

Although not shown in FIG. 1D, it will be appreciated that the RAN 204 may be connected to other ASNs and the core network 206 may be connected to other core networks. The communication link between the RAN 204 the other ASNs may be defined as an R4 reference point, which may include protocols for coordinating the mobility of the WTRUs 102*a*, 102*b*, 102*c* between the RAN 204 and the other ASNs. The communication link between the core network 206 and the other core networks may be defined as an R5 reference, which may include protocols for facilitating interworking between home core networks and visited core networks.

When referred to hereafter, the terminology "wireless transmit/receive unit (WTRU)" includes but is not limited to a user equipment (UE), a mobile station, a station (STA), a fixed or mobile subscriber unit, a pager, a cellular telephone, a personal digital assistant (PDA), a computer, or any other type of device capable of operating in a wireless environment. When referred to hereafter, the terminology "base station" includes but is not limited to a Node-B, a site controller, an access point (AP), or any other type of interfacing device capable of operating in a wireless environment.

In a non-coherent system, information can be communicated using the intensity of the transmitted signal. These systems may be referred to as Intensity-Modulated Direct Detection systems (IM/DD). When using OFDM in an IM/DD system, the transmitted OFDM waveform typically is real and positive so that it can be used to modulate the intensity of the waveform. This has lead to at least two implementations for non-coherent wireless OFDM: Asymmetrically-Clipped Optical OFDM (ACO-OFDM) and DC-Biased Optical OFDM (DCO-OFDM). Both methods use Hermitian symmetry of the frequency domain data to ensure a real-valued time-domain signal but they may differ in how the waveform is kept positive.

In ACO-OFDM, the waveform may be clipped at zero whereas in DCO-OFDM, a DC offset may be added to ensure the majority of the waveform has a positive value. Using properties of the FFT, an ACO-OFDM transmitter can adjust the data allocated to each subcarrier in such a way that clipping the signal at zero does not introduce any distortion. This feature may come at the expense of halving the effective number of subcarriers which can carry information. Despite making use of half the subcarriers compared to DCO-OFDM, ACO-OFDM has been shown to be the most energy efficient and the best at reducing peak-to-average power ratio (PAR). This feature is of concern for optical communication systems in particular due to the imposed safety limits on these systems which may restrict the transmit power. Furthermore, ACO-OFDM may be the transmission technique of choice for wireless optical communications systems using IM/DD, as it may be more efficient in terms of channel capacity than On-Off-Keying (OOK) and Pulse-Position Modulation (PPM).

Figure 2:
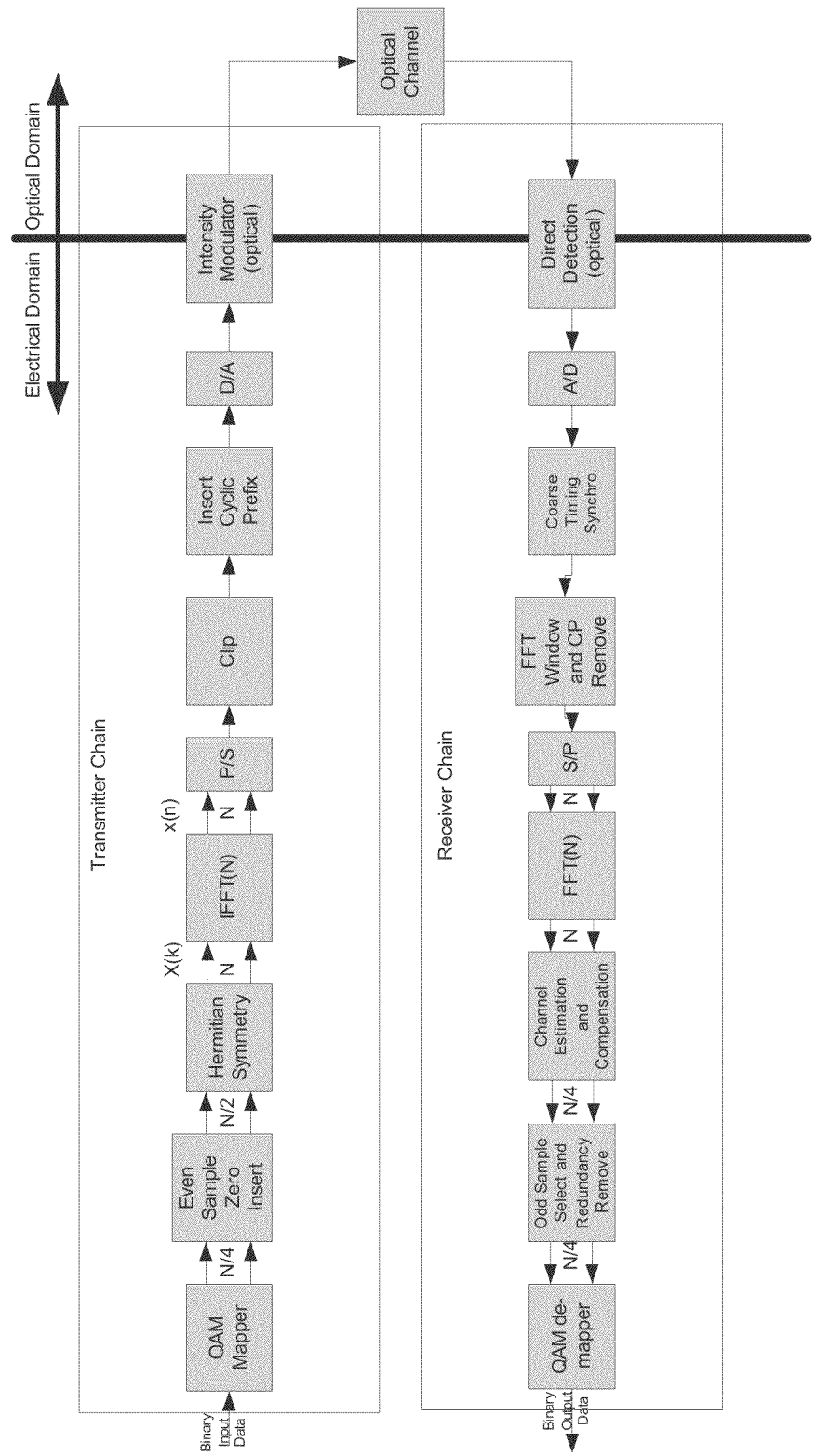
FIG. 2 illustrates an exemplary Optical IM/DD apparatus using ACO-OFDM consistent with embodiments.

FIG. 2 shows an exemplary block diagram of an optical IM/DD system using ACO-OFDM contemplated by embodiments. Although the diagram of FIG. 2 has been drawn particularly for optical wireless systems, it may represent any intensity-modulated non-coherent wireless system if the intensity modulation stage and direct detection stage of the transmitter and receiver chains are replaced, for example.

The ACO-OFDM system of FIG. 2 illustrates a modified OFDM system that is consistent with contemplated embodiments. By way of example and not limitation, the Even Sample Zero Insert block, the Hermitian Symmentry block, the Clip block, Coarse Timing Synchronization, Channel Estimation and Compensation, and the Odd Sample Select and Redundancy Remove block are examples of blocks/functions that may be used to modify an OFDM system for ACO-OFDM. In FIG. 2, the OFDM symbol may consist of N complex samples taken from a QAM mapper. For ACO-OFDM, an Even Sample Zero Insert (ESZI) block takes a set of N/4 complex samples from the QAM mapper, where N is the number of samples in the FFT/IFFT, and may insert zeros at all even frequency subcarriers within the OFDM symbol such that the odd frequency subcarriers, and in some embodiments only the odd frequency subcarriers, carry information. Embodiments contemplate that this may ensure that distortion resulting from asymmetric time-domain clipping may effect only the even frequency subcarriers. The odd frequency subcarriers may have their amplitude reduced by one-half but are otherwise undistorted. The ESZI block also may simplify the transmitter and receiver implementation to some degree, as the modulation rate may be approximately one quarter of the rate at which the FFT/IFFT is run.

The Hermitian Symmetry block may use the resulting N/2 samples to create an OFDM symbol with N samples which is Hermitian symmetric $(X(N-k)=(X^*(k)$ for $k=[0, N-1])$. This symmetry ensures that the unclipped time-domain signal $x(n)$ is real-valued. The signal $x(n)$ may be clipped at zero, perhaps following addition of a cyclic prefix (CP) of L samples, so that it can be used to intensity-modulate a source of a specific wavelength. After propagation of the signal through a channel which exhibits absorption, scattering, and reflection, the receiver may directly detect the intensity of the received signal and may convert this intensity into an analog electrical signal. The remainder of the receiver is similar to the standard OFDM receiver except for two at least two differences. At least one difference is that a frequency offset estimation/synchronization may not be performed because IM/DD was used instead of oscillators for up/down-conversion. Another difference is that even-frequency carriers and redundant carriers introduced by the Hermitian Symmetry block may not be used by the QAM de-mapper.

ACO-OFDM is an energy efficient modulation scheme that can better compensate for multi-path dispersion which may arise in a system using non-coherent modulation. ACO-OFDM may also provide scalability as ACO-OFDM can be applied in multiple transmitter systems. Further, ACO-OFDM may provide integration with MIMO as OFDM can be combined with MIMO and ACO-OFDM may allow the application of MIMO techniques to IM/DD systems.

Embodiments contemplate that OFDM systems may be sensitive, perhaps highly sensitive, to timing synchronization errors. For additive white Gaussian noise (AWGN) channels and multipath fading channels with short channel impulse responses, an initial (e.g., coarse) timing error may be fully corrected by frequency domain channel estimation as long as the error is smaller than L–v samples and that the estimated timing may fall within the cyclic prefix, where v may be the channel length or the length of the impulse response of the channel. In the case where either of these two conditions does not hold, inter-carrier interference (ICI) may degrade performance of the receiver. As a result, a coarse timing estimator may be accurate within a few samples to allow channel estimation to correct any residual timing offset. In addition, sampling clock offsets may cause the required receiver FFT window to drift, which may require continuous resynchronization in order for the receiver to maintain the correct FFT window timing, for example.

Embodiments contemplate that presently known timing synchronization techniques for OFDM systems, when applied to ACO-OFDM, may not perform well due, at least in part, to the clipping of negative portions of the signal inherent in ACO-OFDM. Also, timing synchronization techniques that have been defined for ACO-OFDM may use a training symbol to perform synchronization. Transmission of training symbols may result in overhead which may be considerable when synchronization needs to be performed continually by a user equipment to support mobility and to avoid the effects of FFT window drift, for example. The need for constant re-synchronization is useful, and perhaps important, in optical channels, where the channel delay may change considerably with changes in the environment. For example, an obstacle that is moved between the transmitter and receiver in an optical communications link using UV, visible light, or infrared may change the link from a line-of-sight (LOS) link to a non-line-of-sight (NLOS) link. The change may modify the channel impulse response, perhaps considerably.

The blind synchronization techniques for traditional OFDM may employ a continuous correlation function between L samples offset by N to each other, in order to find the coarse (e.g., approximate) position of the cyclic prefix within the received samples. L and N may be parameters that, at least in part, define the OFDM symbol in the time-domain (for one or more OFDM systems). N may be the length of the OFDM symbol (e.g., the IFFT size) that may be used to convert the symbol from the frequency domain to the time domain during modulation. Following the IFFT, a cyclic prefix of length L may be added to the symbol, and L+N samples may be transmitted over the air. L may be referred to as a cyclic prefix length, for example. The technique may be followed up with a fine timing synchronization, which may be performed together with channel estimation. The traditional blind timing synchronization technique for OFDM may be unsuitable for ACO-OFDM systems because some or all of the negative samples have been clipped by the transmitter, and the cyclic prefix may be composed of all, or nearly all, zero samples in the case where, for example, the last L samples of the OFDM symbol at the transmitter were all, or nearly all, negative. Even when a potential worst-case scenario (such as where the last L samples of the OFDM symbol at the transmitter are all, or nearly all, negative samples, and therefore, the transmitted cyclic prefix consists of all, or nearly all, zero samples) may not occur, the presence of clipped (e.g., zero) samples in the cyclic prefix may lower the correlation metric calculated at the receiver and may introduce uncertainty in the timing estimate. Methods of performing blind timing synchronization for ACO-OFDM would be useful.

Embodiments contemplate methods and apparatuses for blind timing synchronization for OFDM, which may be tailored to the ACO-OFDM waveform. Embodiments contemplate the use of a running correlator of successive blocks of N/2 samples to find the minimum in the running correlation function. Due to one or more properties of inverse FFT (IFFT), a noise-free ACO-OFDM signal may have a correlation of zero when the first block of N/2 samples is correlated with the second block of N/2 samples. As a result, the minimum of the N/2 running correlation function may identify the location of the start of the FFT window at a receiver. As embodiments may use properties of the ACO-OFDM time-domain signal structure, no pilots or training sequences may be required for coarse timing synchronization and may therefore use a fully blind synchronization technique. Additionally, the correlation may make use of the entire ODFM symbol, so it may be more accurate and faster than a cyclic-prefix based correlation method or any other correlation-based method that may be applied to ACO-OFDM as indicted by simulation results disclosed herein.

Although embodiments may apply the described synchronization techniques to an ACO-OFDM system, one or more techniques may also be applied to any type of frame-based timing synchronization where the data or synchronization burst may have an N/2-based symmetry. This may include wireless and wire-line links using coherent and/or non-coherent transmission techniques where the receiver may need to blindly determine the boundary of the frame.

Figure 3:
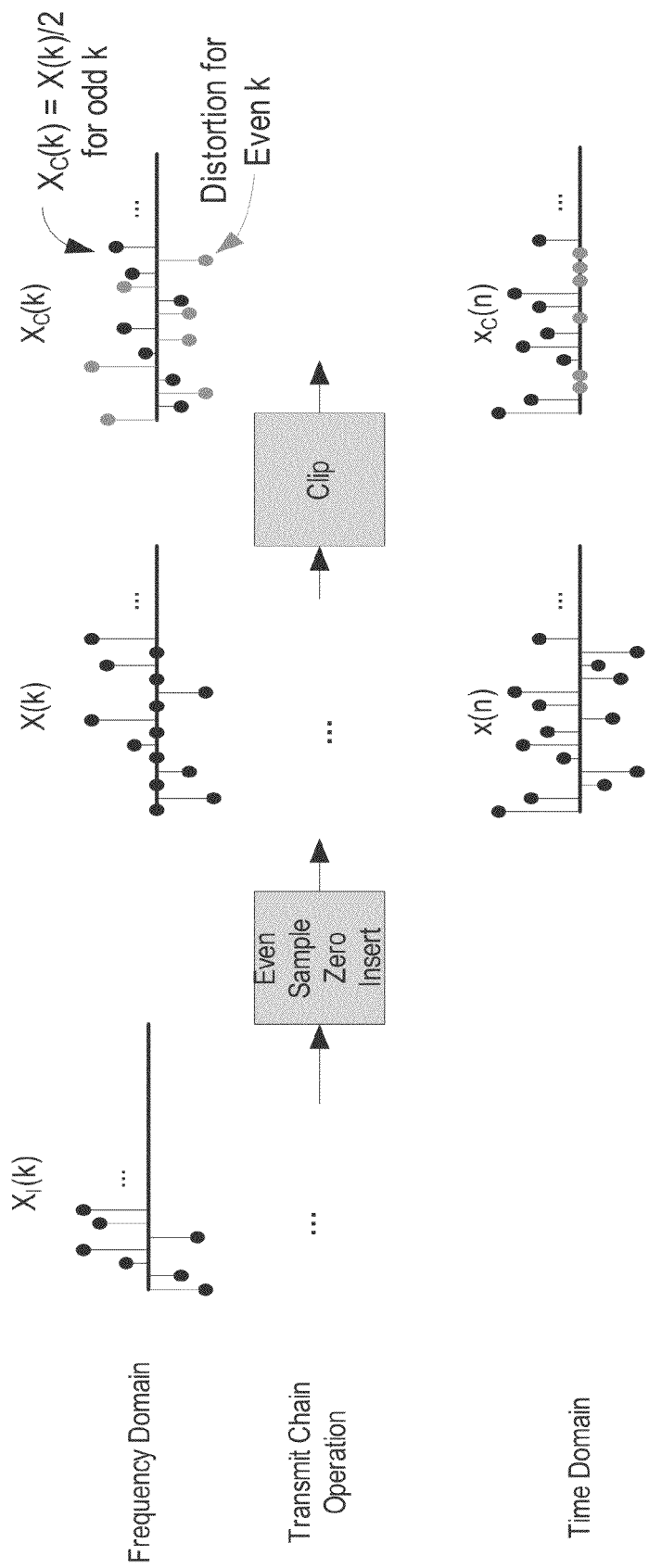
FIG. 3 illustrates an exemplary effect of clipping on a frequency domain symbol with even sample zero insert consistent with embodiments.

Embodiments contemplate that timing synchronization may be derived using at least some basic properties of the ACO-OFDM symbol. By way of example, an ACO-OFDM transmitter may use an even sample zero insert (ESZI) function to set all, or nearly all, even frequency domain samples of the ACO-OFDM symbol to zero. At least one reason for this function is to ensure that clipping performed in the time domain does not cause any distortion to the data samples in the frequency domain. Due to properties of the FFT, when even sample zero insert is applied in the frequency domain, the clipping that is done in time domain prior to carrier modulation may result in distortion on the even subcarriers, and in some embodiments only on the even subcarriers. For example, FIG. 3 illustrates that because the odd subcarriers are actually carrying data, the clipping results in substantially little or no distortion on the data-carrying odd subcarriers—apart from a scaling by half, which may be accounted for in channel estimation.

Figure 4:
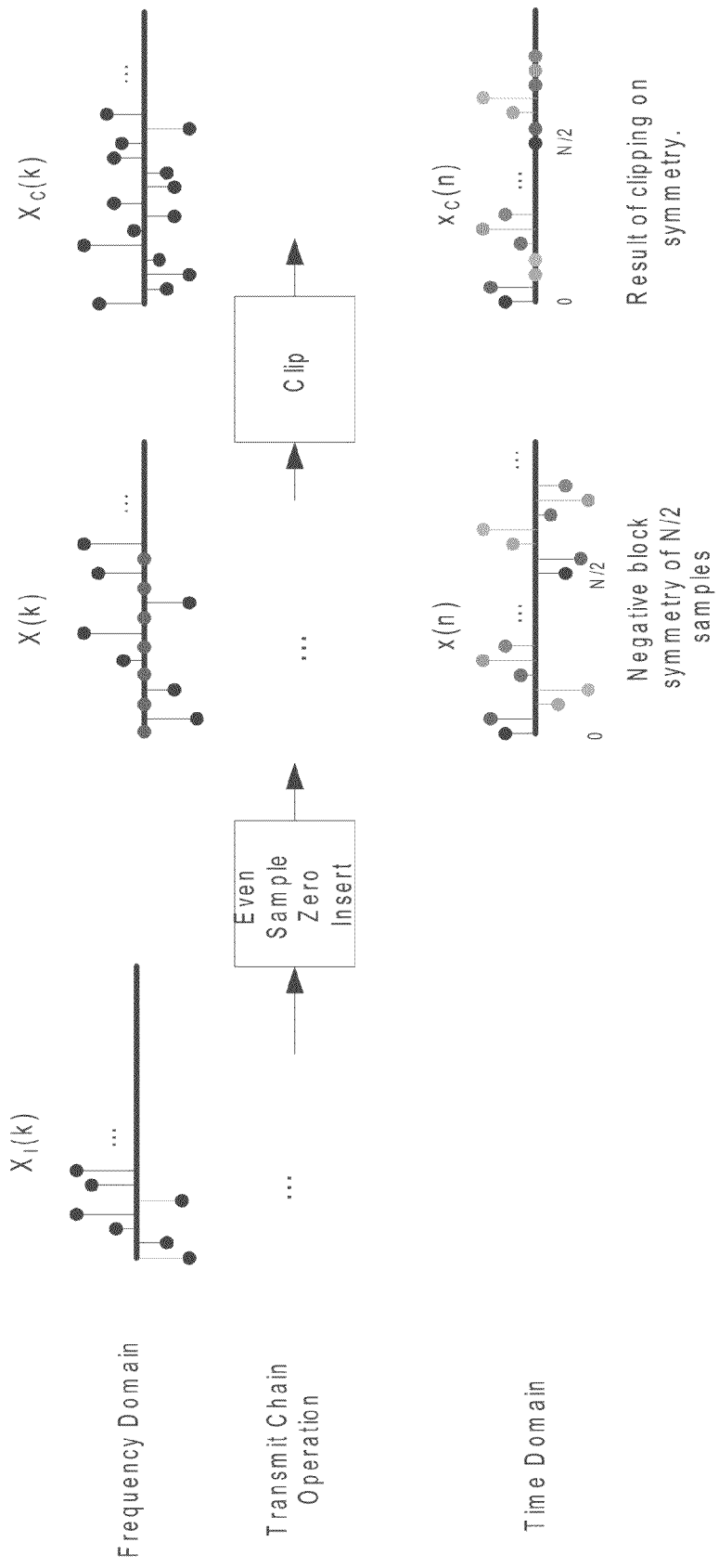
FIG. 4 illustrates an exemplary negative block symmetry resulting from even sample zero insert consistent with embodiments.

Another consequence of the even sample zero insert function is that it may result in a negative block symmetry of N/2 samples in the time domain OFDM symbol prior to clipping, for example, $x(n) = -x(n+N/2)$, where $x(n)$ is an unclipped time-domain signal. As a result, once clipping is performed, each pair of samples $[x_C(n), x_C(n+N/2)]$ may be such that at least one of them may have a value of zero, where $x_C(n)$ is a clipped time-domain signal. An example of this is illustrated in FIG. 4.

Embodiments contemplate that blind timing synchronization may be based on the correlation of successive blocks of N/2 samples of the time domain signal, which in some embodiments may be expressed as shown in Equation (1):

$$\sum_{n=0}^{N/2-1} x_c(n) * x_c(n+N/2) \quad \text{Equation (1)}$$

Due to the block symmetry that may be caused by the even sample zero insert function followed by clipping at zero, the correlation between the first block of N/2 samples and the second block of N/2 samples of at least some time domain ACO-OFDM symbols may be zero, and in some embodiments, every time domain ACO-OFDM symbol may be zero, perhaps because of an absence of channel distortion and noise. This is because each product term in the correlation sum of Equation (1), when applied at the OFDM symbol boundary, may consist of a sample pair where one of the samples may be zero, for example.

Exemplary synchronization techniques may determine at least one symbol boundary of the ACO-OFDM symbol at the receiver as the timing offset that may minimize the N/2 block correlation function of Equation (1) when applied to the received samples. A minimum value of the function at the receiver may indicate at least one boundary of the ACO-OFDM symbol. The correlation may be applied regularly to allow the receiver to correct timing offsets caused by sampling clock drift and varying channel delay, for example.

Embodiments contemplate that the N/2 block correlation may be achieved by first computing a running block based correlation function in Equation (1). An example of this function is plotted in FIG. 5 for a random ACO-OFDM at the receiver of FIG. 2, and represents an exemplary processing performed by the coarse timing synchronization block. Also plotted for comparison is the cyclic prefix correlation function which may be used in timing synchronization using the cyclic prefix based method. The channel is assumed AWGN with standard deviation of 0.01, and N=512, L=12 are used.

Figure 5:
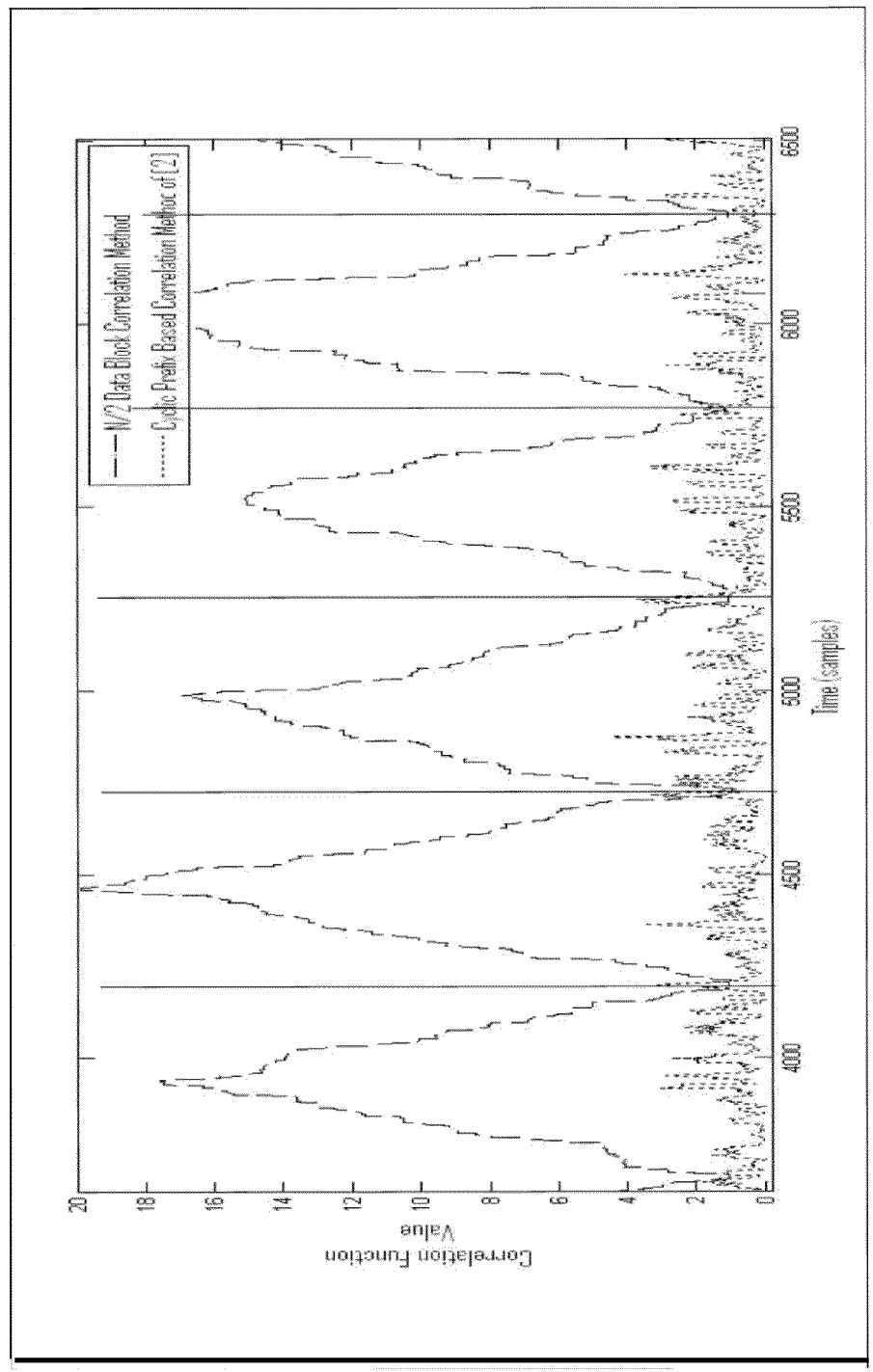
FIG. 5 illustrates an exemplary comparison of N/2 block correlation and cyclic prefix correlation functions consistent with embodiments.

For the N/2 block correlation technique, the location of the symbol may be obtained by finding the minimum of the correlation function and so the valleys of this curve may be of interest. In a traditional cyclic prefix based correlation method, the symbol location may be estimated as the peaks of the correlation function formed by correlating a set of L consecutive samples with another set of L samples located N samples away. FIG. 5 also illustrates that the cyclic prefix correlation function may be noisy when applied to an ACO-OFDM. The cyclic prefix correlation function may contain false peaks located perhaps far from the actual symbol timing locations and the peaks occurring at the symbol timing locations may often be smaller in magnitude than neighboring false peaks.

Due to these issues, the coarse timing synchronization block of FIG. 2 may choose incorrect symbol timing. This behavior may be explained by the presence of zero samples in the transmitted cyclic prefix due to clipping in ACO-OFDM. These samples may cause the cyclic prefix correlation function to be lower at the symbol boundaries than with regular OFDM, thus possibly destroying the large correlation value that may be used for synchronization. In contrast, the N/2 block correlation embodiments may show well-defined minimums located at some or each of the symbol timing boundaries. The zero values in the data due to clipping may be used to improve the synchronization because a minimization approach may be used instead of a cyclic prefix correlation, which may instead require maximization. For at least these reasons, a timing synchronization algorithm based on N/2 block correlation may outperform an algorithm based on cyclic prefix based correlation.

Figure 6:
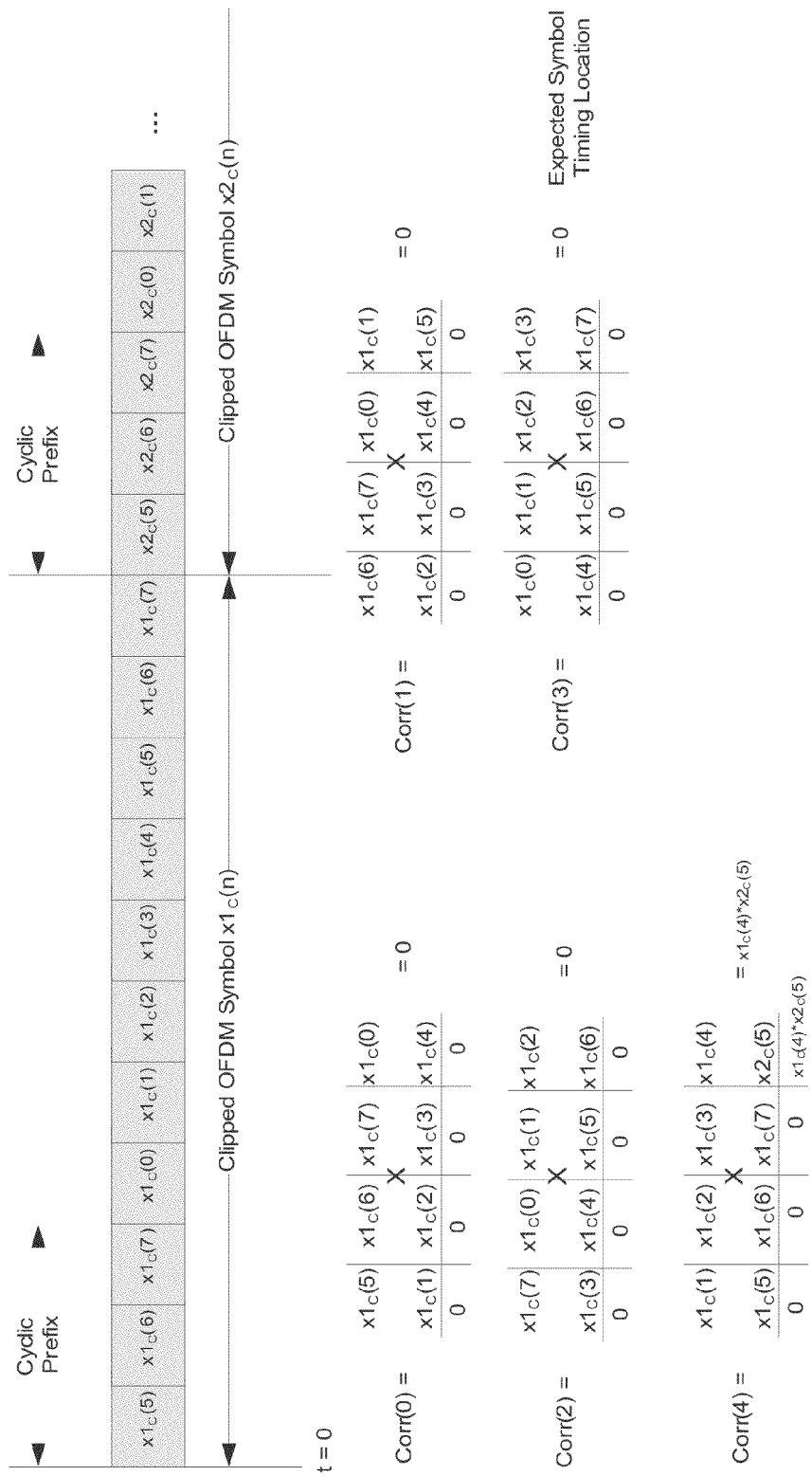
FIG. 6 illustrates an exemplary correlation computation demonstrating a duration of correlation function minimum consistent with embodiments.

Embodiments contemplate that the N/2 block correlation function has a minimum which may extend over approximately L+1 samples as opposed to a single sample, for example. This extension may be due to the properties of the cyclic prefix and/or the fact that sample pairs [$x_C(n)$, $x_C(n+N/2)$] from the same OFDM symbol may have a product of zero in the absence of noise. This is demonstrated in the examples of FIG. 6, where the examples use N equal to eight and L equal to three. Due to the duration of the minimum in the block correlation function and/or the presence of noise and multipath distortion, symbol frame detection may be performed by measuring the correlation change between successive samples. When the correlation function increases by at least a positive Δ from sample n to sample n+1, the timing synchronization block may claim sample n to be the OFDM symbol boundary. The value of Δ may be obtained by statistical data analysis for the particular system, but other possible methods are contemplated. Although some embodiments may use a change in Δ of the correlation function to determine the correct OFDM timing, other embodiments of detecting the timing based on the N/2 block correlation function are also contemplated.

Figure 7:
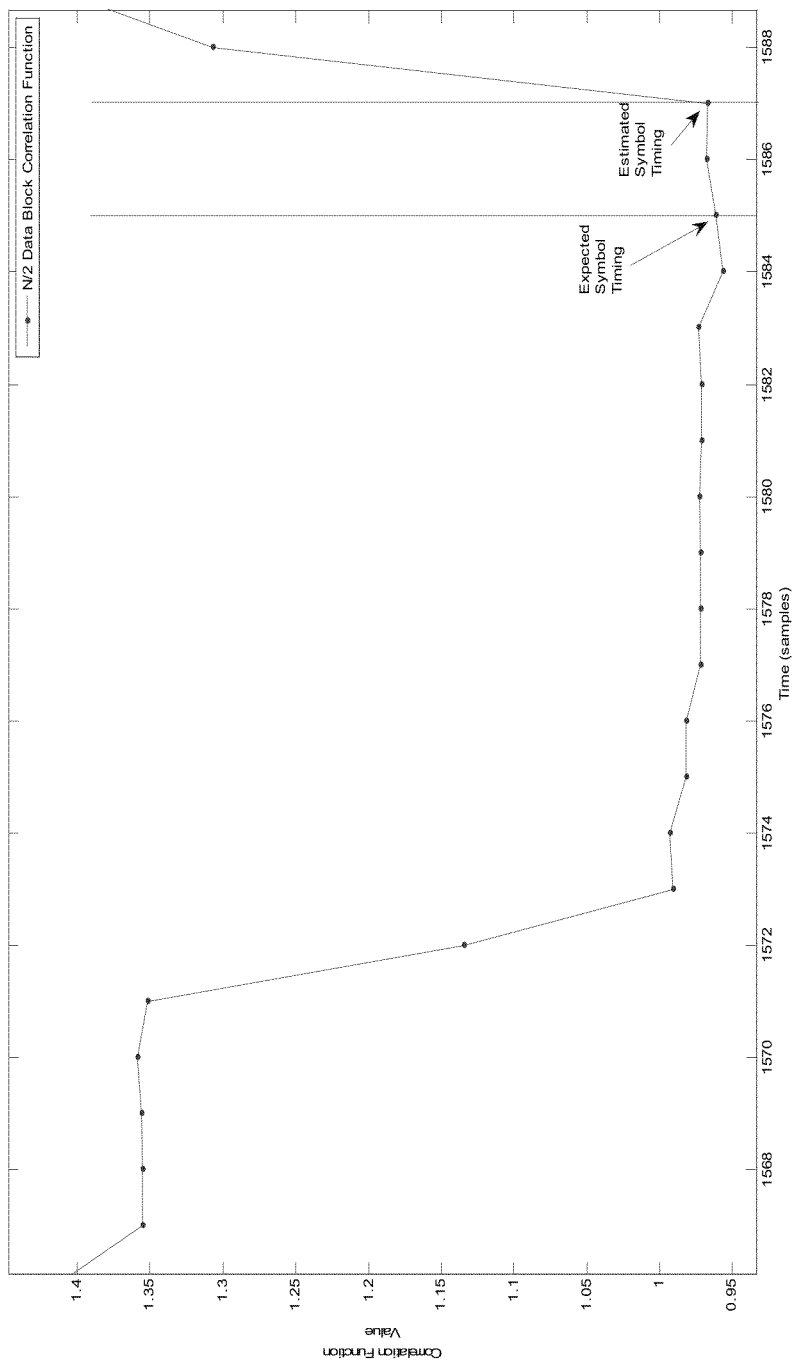
FIG. 7 illustrates an example of finding a symbol timing from a correlation function consistent with embodiments.

FIG. 7 shows the application of an exemplary synchronizing embodiment on the same simulated system as illustrated in FIG. 5. In the illustrated example, an estimated symbol timing lags the expected symbol timing by two samples. Some causes of the symbol timing lag as well as several techniques which may resolve such causes are described in the following paragraphs.

Embodiments contemplate symbol timing synchronization algorithms for ACO-OFDM that may include at least two parts: a coarse symbol timing technique and a fine synchronization technique. The coarse symbol timing technique may compute an N/2 block correlation as described previously and may use the results to estimate the symbol timing. The fine synchronization technique may be performed in conjunction with channel estimation, which may eliminate some or any residual timing errors and may handle fractional timing errors due to sampling clock offsets, for example. The ACO-OFDM synchronization algorithms may also be applied to a transmitter that performs up-sampling before transmission and may use a fractionally-spaced receiver. Embodiments contemplate that as long as the coarse synchronization technique estimates the symbol timing within L−v samples, or less, within the cyclic prefix, then residual timing errors may be at least partially or, in some embodiments, fully corrected by channel estimation. Embodiments contemplate that this may be performed by adding a fixed complex rotation to the estimated channel coefficients that may account, at least in part, for the delay in the time domain.

Embodiments recognize that residual timing errors may be introduced by noise and multipath in the system. In addition, residual timing errors using the N/2 block correlation may arise when the first data samples correlated between different symbols may have one of their samples being zero due to clipping. For example, the term Corr(4) in FIG. 6 may be zero because one of the two samples $x1_C(4)$ or $x2_C(5)$ were affected by clipping. Embodiments contemplate that timing synchronization algorithms based on N/2 block correlation discussed in the following paragraphs may be used to alleviate residual timing errors, at least in part. Any combination of two or more of the algorithms may also be used. Alternatively or additionally, the timing error correction techniques used by the algorithms may be applied at different stages of the receiver chain and they are not limited to being applied immediately following the computation of the N/2 block correlation, for example.

Embodiments contemplate that a window advance algorithm may include advancing the estimated symbol boundary by a predefined number of samples to create an estimate that may be biased a number of samples early, for example a few samples early, compared to the estimate given by the N/2 block correlation. As discussed previously, clipping may result in an estimated symbol boundary that may be often delayed with respect to an expected symbol boundary. The probability of a delay of D symbols between the expected and estimated symbol timing may decrease as D increases. The number of samples to be advanced may be chosen to maintain a predefined percent confidence (e.g., 90%) that the final estimated symbol boundary is exact or falls inside the cyclic prefix of the previous symbol. Other methods of choosing D are contemplated.

One or more exemplary embodiments that use the window advance algorithm may compute the N/2 block correlation of equation (1) on N+L consecutive samples and may use the Δ method described previously to determine an initial estimate of the symbol boundary. Embodiments may determine a value of D (e.g., the delay between the estimated and expected symbol boundary for which the probability of this delay is within a certain confidence interval). Also, embodiments may advance the estimated symbol boundary by D samples based on the value of D found previously. Also, embodiments contemplate that channel estimation may inherently perform residual timing offset correction. And embodiments contemplate that one or more of the previously described window advance algorithm procedures may be periodically repeated so that correct coarse timing may be maintained in the presence of channel changes and/or sampling frequency drift.

Embodiments recognize that in multipath fading channels where the channel length or length of channel impulse response v may approach the cyclic prefix length L, a delay D that may be chosen by the window advance algorithm may exceed L−v which may cause inter symbol interference (ISI). Embodiments contemplate an N/2 block correlation averaging algorithm that may reduce the delay D by averaging the correlation over multiple symbols in time, thus reducing the effect that clipping may have on the residual timing error. As more correlation functions are averaged, the difference between the estimated and actual symbol timing may become closer to zero. An exemplary averaged correlation function for a given sample may be expressed as defined in Equation (2):

$$\sum_{k=0}^{M-1} \sum_{n=0}^{N/2-1} x_C(n+k(N+L)) * x_C(n+N/2+k(N+L)) \qquad \text{Equation (2)}$$

One or more exemplary embodiments that use the N/2 Block correlation averaging algorithm may compute the average correlation function of Equation (2) over M*(N+L) consecutive samples, where M is the number of time domain OFDM symbols (e.g., the number of blocks, where each block may contain N+L samples) that may be averaged to obtain the correlation metric in equation 2. This average may be computed as a one-shot average or a sliding window average that may be maintained continuously at all times and used when re-synchronization is requested. Using the Δ method described previously, embodiments may determine the initial estimate of the symbol boundary from the computed average correlation function. Based on the number of symbols M used in the averaging, embodiments may advance the window by a small number of samples d. Embodiments also contemplate that channel estimation may inherently perform residual timing offset correction. And embodiments contemplate that one or more of the previously described N/2 Block correlation averaging algorithm procedures may be periodically repeated so that correct coarse timing may be maintained in the presence of channel changes and/or sampling frequency drift.

Embodiments contemplate a point-by-point movement algorithm for timing adjustments. The point-by-point algorithm may use an adaptive update of the timing estimate that may be based on an estimate of the timing location obtained in the last symbol, a current estimate, and a restriction to the change in the symbol timing that may be made during any given symbol period. At least one product of the point-by-point movement algorithm may be to smooth out or eliminate residual timing errors caused by the clipping effect described previously. One or more embodiments may compute an initial symbol timing using at least one of the other previously described timing adjustment algorithms. For each subsequent symbol, embodiments may compute the N/2 block correlation of Equation (1) on the N+L consecutive samples. Embodiments contemplate that if the estimate indicates an advance may be needed based on the last estimate of the symbol timing, then the advance may be allowed to take place. Embodiments also contemplate that if the estimate indicates a delay may be needed, then the delay may be allowed to take place. In some embodiments, the delay may be allowed to take place only if it may be a small delay, or if the last K decisions have indicated that a similar delay may be required. K is an integer parameter which may be configurable based on the design of the scheme. K may represent the number of consecutive decisions that have indicated a similar delay before an actual delay is chosen. Embodiments contemplate other criteria for allowing the delay to take place. And embodiments contemplate that one or more of the previously described point-by-point movement algorithm procedures may be periodically repeated so that correct coarse timing may be maintained in the presence of channel changes and/or sampling frequency drift.

One or more of the previously described timing adjustment algorithms may try to resolve the issue of residual timing offset caused by clipping by using techniques at the receiver, and in some embodiments at the receiver only. Other embodiments contemplate the insertion of a limited, perhaps negligible, amount of redundancy by a transmitter where the redundancy may ensure that the N/2 block correlation increases by Δ at an expected or correct time, where Δ refers to the increase in the correlation which indicates the expected symbol timing. This may be performed by ensuring that the samples involved in computing the first correlation value where two different symbols involved are non-zero. For example, considering FIG. 6, this means that the $x1_C(4)$ and $x2_C(5)$ may both be a non-zero value. To ensure this, embodiments contemplate that the time domain symbol at the transmitter may be extended by a minimum of four samples (e.g., two samples that may ensure a non-zero correlation term, and two samples that may ensure the new derived symbol maintains the property that $x(n)=-x(n+N/2)$ required for correlation).

By way of example, embodiments contemplate that dummy samples may be inserted in the transmitter prior to the insertion of the cyclic prefix. Embodiments contemplate that a dummy sample may include a non-zero time domain sample may not include data. One or more dummy sample may be inserted into the transmitted time-domain signal and the one or more dummy samples may be discarded by the receiver. The dummy samples may serve to simplify the task of synchronization, and in some embodiments may only serve to simplify the task of synchronization. The location of the dummy samples may be as follows: at position of $x_C(N/2)$ insert a non-zero value and at position $x_C(0)$ insert zero; at the position of $x_C(N-L)$ insert a non-zero value and at position $x_C(N-L-N/2)$ insert zero; and the new cyclic prefix that may be used is now L+1 sample long instead of L samples long.

One or more embodiments contemplate that algorithms which assume the insertion of dummy samples as described previously may compute the N/2 block correlation of Equation (1) on N+L+5 consecutive samples, for example, assuming the transmitter has inserted four dummy samples. Embodiments contemplate that the Δ procedure described previously may be used to determine the estimate of the symbol boundary. Based on the estimate and timing location, embodiments contemplate that the dummy samples may be removed and the remainder of the receive chain may be continued with the N resulting samples. And embodiments contemplate that one or more of the previously described procedures of algorithms which assume the insertion of dummy samples may be periodically repeated so that correct coarse timing may be maintained in the presence of channel changes and/or sampling frequency drift.

Although the previous description illustrates the use of four dummy samples, embodiments contemplate that algorithms may use a greater number of dummy samples to artificially increase the value of the correlation at the symbol boundary beyond just one sample, for example.

Figure 8:
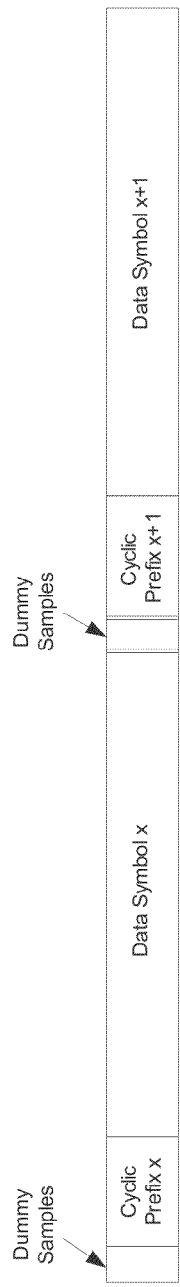
FIG. 8 illustrates an exemplary introduction of dummy samples prior to cyclic prefix consistent with embodiments.

Embodiments contemplate avoiding the increase in redundancy associated with the insertion of dummy samples which adhere to the rules of ACO-OFDM. Specifically, a considerable gain can be achieved by the insertion of a fixed or predetermined number of dummy samples prior to the cyclic prefix, and in some embodiments prior to the cyclic prefix only, as shown in FIG. 8. Typically, one or two dummy samples inserted at this location may be sufficient to reduce, perhaps considerably, the difference between the expected symbol timing location and an increase, perhaps a sharp increase, in the correlation function. Furthermore, since it may be assumed that the timing error may remain inside the cyclic prefix, the introduction of these dummy samples may not introduce ISI as long as this assumption is correct. The receiver may discard these extra dummy symbols, as it may do with the cyclic prefix by assuming that the cyclic prefix is longer by a number of samples equal to the number of dummy samples.

Figure 9:
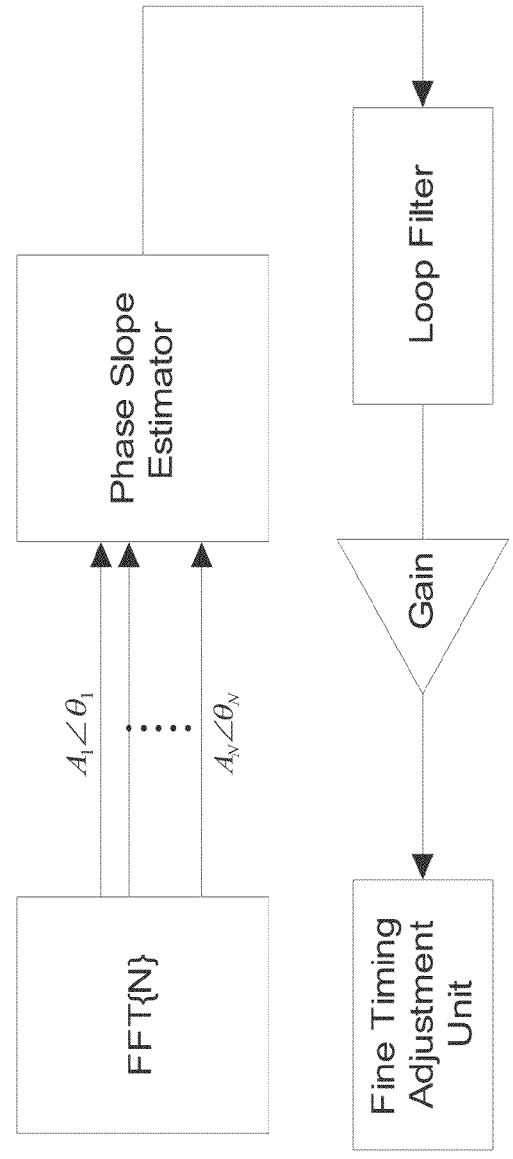
FIG. 9 illustrates an exemplary overall block diagram of a phase slope based symbol timing recovery consistent with embodiments.

Embodiments contemplate that frequency domain phase offset may generally be employed for fine timing adjustment that may be performed directly in the frequency domain, as mentioned previously. Additionally, embodiments contemplate that one or more frequency domain phase offset estimation algorithms may be employed to correct coarse errors in the N/2 block correlation by feeding back the decisions of the phase offset estimation back to the time domain. An exemplary mechanism for correcting the coarse symbol timing in ACO-OFDM systems is illustrated in FIG. 9. A phase slope estimator may take the FFT complex outputs and may determine the phase slope by comparing consecutive symbols, as described in Equation (3). The fine timing adjustment unit may change the symbol timing to account for possible initial coarse timing errors of the N/2 block correlation.

$$\Delta \text{Slope}(\theta) = \text{Slope}(\theta)_{n+1} - \text{Slope}(\theta_n) \text{ where } n \text{ indicates symbol } n. \quad \text{Equation (3)}$$

Embodiments contemplate that one or more frequency domain phase offset estimation algorithms may compute the N/2 block correlation of Equation (1) on N+L consecutive samples. Embodiments also contemplate that the Δ method described previously may be used to determine the initial estimate of the symbol boundary. Also, embodiments contemplate decisions from the fine timing adjustment unit may be used to change the symbol timing used for the next symbol, for example. And embodiments contemplate that one or more of the previously described procedures for frequency domain phase offset estimation algorithms may be repeated, for at least one or every received symbol, so that correct coarse timing may be maintained in the presence of channel changes and/or sampling frequency drift.

In FIG. 2, the compensation of distortions from sampling frequency offset (SFO) between the transmitter and receiver, as well as a residual timing offset (RTO) left by coarse timing synchronization, may be lumped into the channel estimation block, for example. This may result in an estimated channel frequency response which may account for these distortions in addition to the fading channel itself. In general, the channel model may not account for all of these distortions. For example, residual timing errors in OFDM having a cyclic prefix (CP) length of L and a channel impulse response (or channel length) of v may be at least partially or fully corrected by frequency domain channel estimation, but in some instance perhaps only as long as the error is smaller than L–v samples and that the estimated timing falls within the CP. When these conditions may not hold and/or the channel estimate may not account for the timing error, inter-carrier interference (ICI) may occur which may degrade the performance of the receiver.

Traditional OFDM systems have been considered which perform channel estimation jointly with correction of timing and frequency offsets in order to remedy the inability of channel estimation to account for these offsets. These traditional systems may suffer from an increase in complexity for at least the reason that each distortion may not be estimated separately. The traditional systems may also be limited in the size of the frequency offset or the timing distortion that may be corrected.

For a system using ACO-OFDM, accurate channel estimation is useful for minimizing the transmit power. Since ACO-OFDM carries information on the intensity of the carrier waveform, transmit power is an important design criterion. In order to improve accuracy in channel estimation, embodiments contemplate techniques for compensating for synchronization-related distortions. The contemplated embodiments may improve, or perhaps maximize, channel estimation accuracy. Also embodiments recognize that accuracy of a channel estimator may be impacted by the amount of training data of which the estimator may make use. Embodiments also recognize that the efficiency of an OFDM scheme may be dependant on a reduced amount of overhead represented by the training data.

Embodiments recognize the tradeoff dilemma between channel estimator accuracy and data efficiency in ACO-OFDM, where power consumption is important. System-level techniques would be useful such that channel estimation accuracy may not come at the cost of reduced training sequence redundancy. Embodiments contemplate channel estimation techniques that may be built into a dedicated, and in some embodiments perhaps short-range, link scenario over which ACO-OFDM may typically be used. Embodiments also contemplate that a physical layer frame structure may be useful to enable the link to make use of the embodiments.

Embodiments contemplate techniques for channel estimation which may be useful for ACO-OFDM waveform properties, as well as the system-level primitives and physical layer frame structure that may be useful to implement the techniques in a direct-link ACO-OFDM system. Some embodiments contemplate channel estimation techniques that may include at least three, in some embodiments perhaps distinct, procedures that may be performed concurrently, or in some embodiments may be performed sequentially. By way of summary example, one or more embodiments contemplate that an estimate of the SFO may be obtained and the estimate may be used to change the receiver sampling frequency to remove the SFO. An estimate of the RTO may be obtained and the FFT window may be shifted to compensate for the estimated RTO. Embodiments also contemplate that channel estimation may be performed following the two previously described procedures. Because of the initial correction of SFO and RTO, channel estimation may be more accurate and the expected demodulator performance may be improved. In each of the procedures of the channel estimation described previously, (e.g., SFO correction, RTO correction, and channel estimation), the estimates of each distortion may be corrected by eliminating the dependency on the other distortion during the estimation procedure, for example. As a result, some or any errors caused by SFO and RTO may be reduced or minimized in the final channel estimate. In addition, embodiments contemplate that SFO and RTO may be corrected individually without dependence on each other or on the channel distortion. Therefore, these offsets may also be corrected efficiently.

Separation of the SFO, RTO, and channel estimation may be permitted due to various properties of the ACO-OFDM waveform which may differ from traditional OFDM. First, because ACO-OFDM does not up-convert the baseband waveform to a carrier frequency, the received ACO-OFDM waveform may not suffer from carrier frequency offset (CFO). As a result, CFO may not need to be considered in the signal model used to develop the channel estimator. Second, the baseband ACO-OFDM waveform is real-valued and as a result, the time-domain channel impulse response may be by definition real. This may result in a channel frequency response that is Hermitian symmetric. The Hermitian symmetry results in a redundancy which may be used in both RTO estimation and channel estimation.

Embodiments contemplate an ACO-OFDM receiver which may perform channel estimation using the techniques outline previously. Embodiments may include a receiver station (STA) which may communicate with one or more other STA through a direct or dedicated link. The link may be implemented through burst-mode or continuous mode, for example. The amount and frequency location of training data sent by the transmitting STA may be adjusted dynamically through a reverse physical channel that may also serve as a frame acknowledgement for error control and soft-combining in the presence of unfavorable channel conditions. Embodiments contemplate one or more ACO-OFDM frame structures which may implement the channel estimation scheme for burst-mode and/or continuous mode systems. Also, one or more of the techniques and structures described herein may be applied to traditional OFDM systems.

Some embodiments consider the assumptions of no CFO and a Hermitian symmetric channel frequency response, and those embodiments contemplate that the channel estimation problem may be formulated in a way that the effects of SFO, RTO, and channel distortion may each be estimated and compensated separately. This mathematical formulation may be obtained by sampling the continuous time OFDM waveform on which the data element $X_k$ has been loaded on the $k^{th}$ data subcarrier. The continuous time waveform with subcarrier frequencies $f_k$, is given by Equation (4):

$$x(t) = \frac{1}{N} \sum_{k=0}^{N-1} X_k \exp(j2\pi f_k t) \qquad \text{Equation (4)}$$

After sampling with a sampling period of $T_S+\tau$, where $\tau$ represents the difference in the sampling period between the transmitter and receiver (that may be caused by the SFO) and Ts represents a sample period of OFDM samples, the $m^{th}$ received symbol at sample time n may be expressed as Equation (5):

$$y(n) = \frac{1}{N} \sum_{k=0}^{N-1} H_k X_K \qquad \text{Equation (5)}$$

$$\exp\left(\frac{j2\pi k(n + mN_S + N_g)(1 + \eta)}{N}\right) \exp\left(\frac{-j2\pi kl}{N}\right);$$

$$\eta = \frac{\tau}{T_S}$$

where N is the OFDM symbol size, $N_g$ is the number of samples in the CP, and $N_S$ is $N+N_g$. The first exponential term represents the IFFT definition modified to account for the presence of an SFO. In particular, it may be assumed that at m is equal to zero (0), the sampling times of the transmitter and the receiver coincide closely, and perhaps perfectly, and that the distortion may grow linearly as the sample index n (and consequently the symbol number m) grow with time. The second exponential term corresponds to the distortion caused by an RTO of l samples. Also, $H_K$ represents the channel frequency response of the channel, perhaps assuming no ICI. If the value of l is assumed in the range N–v, and the SFO is maintained at a small amount, the assumption of no ICI may be assumed valid.

With the assumption of no ICI, the channel frequency response that may be seen by the receiver is given by Equation (6):

$$\overline{H}_K = \qquad \text{Equation (6)}$$

$$H_K \exp\left(\frac{j2\pi k(n\eta + mN_S + mN_S\eta + N_g + N_g\eta)}{N}\right) \exp\left(\frac{-j2\pi kl}{N}\right)$$

Embodiments recognize that at least three useful observations may be made from Equation (6) and the model chosen to represent the SFO and RTO. First, as n and m increase, the SFO may result in an increase in the RTO. In particular, the value of the initial RTO (l) in Equation 6 represents the RTO at m=0, but the actual RTO may increase as n (and consequently m) increases. Second, since the modified channel frequency response $\overline{H}_K$ is a function of the time variable n, traditional least-squares (LS) frequency domain channel estimation may not be performed without first correcting the SFO and removing the dependency on n. Finally, it may be advantageous to eliminate/(e.g., the RTO) so that the chances of inducing ICI may be reduced which may degrade the channel estimation performance.

In light of these three observations and other factors, embodiments contemplate that channel estimation techniques that may be utilized by one or more contemplated channel estimators. By way of example a contemplated channel estimator may, first, estimate and eliminate the SFO from the input signal. Then the RTO may be estimated and eliminated from the input signal. Finally, the channel may be estimated using, for example, LS frequency domain channel estimation. The procedure may be repeated, in whole or in part, occasionally in order to maintain accurate channel estimates with changes in the environment. For example, to account for a time varying channel, the channel estimation may be performed periodically. In addition, in order to account for sudden changes in the SFO, the entire procedure may be repeated periodically at an appropriate rate.

Embodiments contemplate that an exemplary channel estimator may include estimating and removing the SFO. This may require a set of initial channel estimates for two subsequent frequency domain symbols received. Given that known OFDM training symbols $X_m$ and $X_{m+1}$ are transmitted and $Y_m$ and $Y_{m+1}$ are received, the initial LS estimates of the channel impulse response are defined as in Equation (7):

$$\hat{H}_m = \frac{Y_m}{X_m}; \hat{H}_{m+1} = \frac{Y_{m+1}}{X_{m+1}} \qquad \text{Equation (7)}$$

Each of the quantities in Equation (7) is a vector of length N. To remove the dependency on n in Equation (6), the channel estimates for each k may be divided to obtain a value whose phase may depend on k, and in some embodiments may only depend on k, and may also depend on the SFO parameter $\eta$ as shown in Equation (8):

$$\frac{\hat{H}_{m+1}(k)}{\hat{H}_m(k)} = \exp\left(\frac{j2\pi kN_S(\eta + 1)}{N}\right) \qquad \text{Equation (8)}$$

Using the value of the quotient for each k, and averaging over all k, the value of $\eta$ may be estimated. The SFO may be eliminated by changing the sampling frequency of the receiver to compensate for the estimated $\eta$ before RTO estimation performed.

Figure 10:
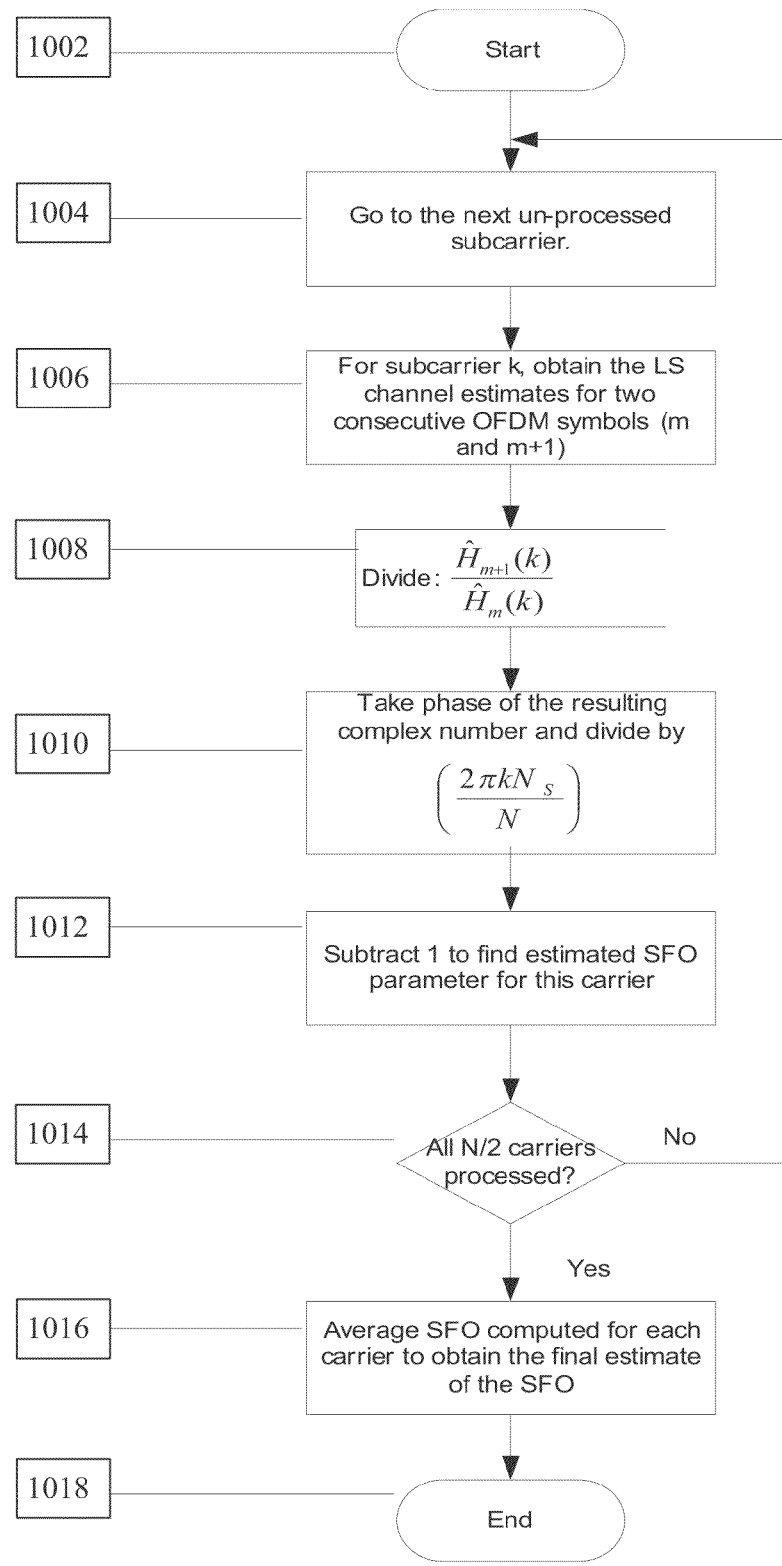
FIG. 10 illustrates an exemplary flow diagram showing an estimation of SFO consistent with embodiments.

The flowchart in FIG. 10 demonstrates an exemplary embodiment for determining the SFO considered in embodiments. In FIG. 10, the after a starting point 1002, at 1004 the next un-processed subcarrier may be determined. At 1006, for subcarrier k, obtain the LS channel estimates for two consecutive OFDM symbols (m and m+1). At 1008, divide $$\frac{\hat{H}_{m+1}(k)}{\hat{H}_m(k)}.$$

At 1010, the phase of the resulting complex number may be divided by $$\left(\frac{2\pi kN_S}{N}\right).$$

At 1012, subtract 1 to find estimated SFO parameter for this carrier. At 1014, determine if all N/2 carriers are processed, and if no return to 1004. If yes then at 1016, an average SFO may be computed for each carrier to obtain the final estimate of the SFO for output at 1018. Variations of this embodiment are also contemplated.

Embodiments contemplate that an exemplary channel estimator may include estimating and removing the RTO. This may be achieved, at least in part, by using the symmetry properties of the channel frequency response. An initial LS channel estimate may first be obtained. With the SFO removed in the SFO estimation as described previously, and with the fact that the actual channel frequency response ($H_k$ in Equation (6)) is Hermitian symmetric (hence, $H_k^* H_{N-k} = |H_k|^2$), N/2 products may be formed to isolate the RTO in the phase of some or each of these products, which all have the form shown in equation (9):

$$\hat{H}_k^* \hat{H}_{N-k} = |H_k|^2 \exp(-j2\pi l) \quad \text{Equation (9)}$$

Because the phase of the actual frequency response may cancel out due to symmetry properties, the phase of some or each of the N/2 products may depend on the RTO parameter l, and in some embodiments may depend only on the RTO parameter l. The N/2 product phases may be averaged to obtain an estimate of the RTO. The RTO may be corrected by shifting the FFT window by/samples before channel estimation using Hermitian symmetry may be performed. Alternatively, RTO estimation and Hermitian symmetry may be performed simultaneously, using the same training symbol and performing the estimation of the channel without first compensating for SFO, for example.

Figure 11:
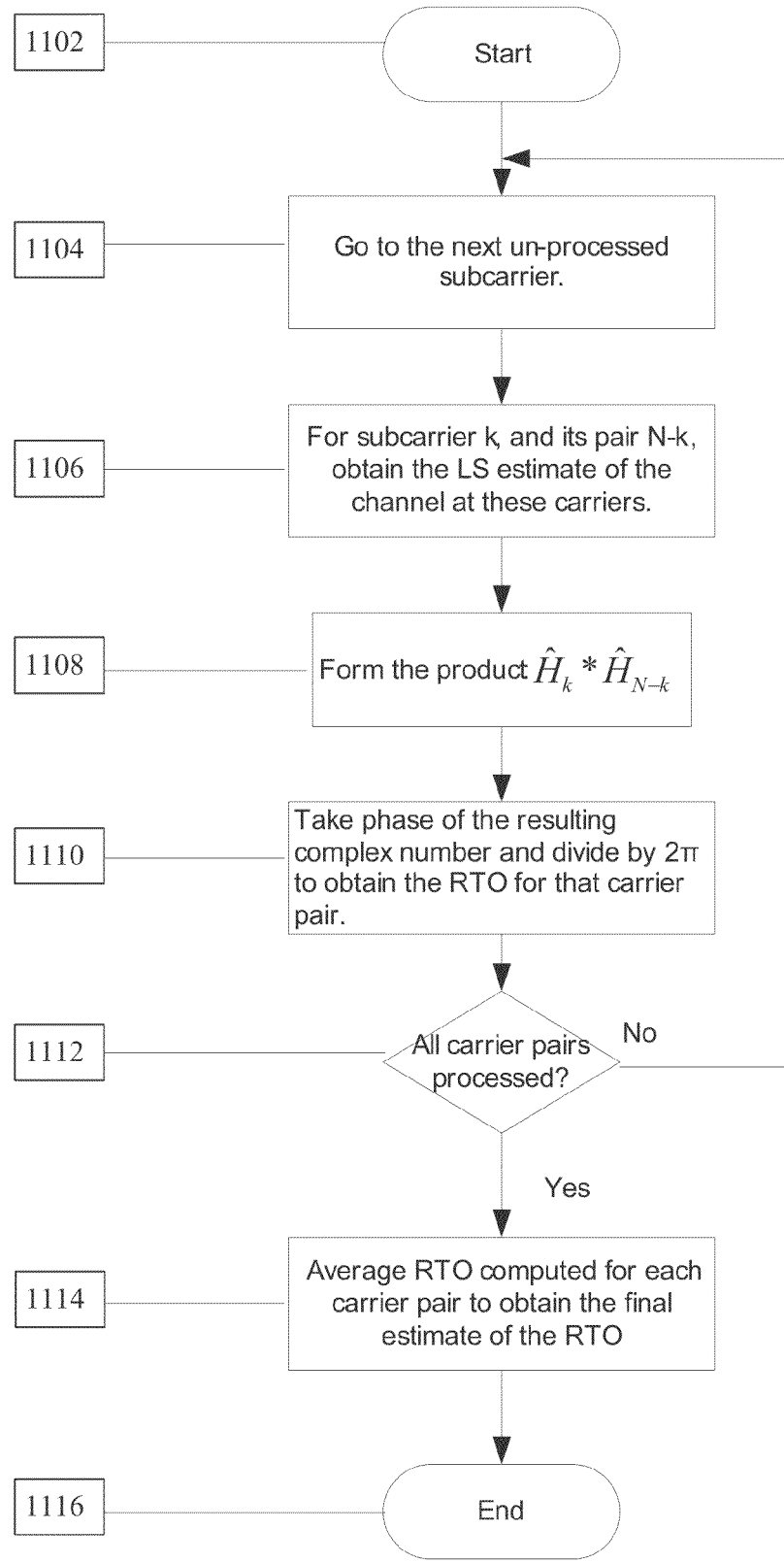
FIG. 11 illustrates an exemplary flow diagram showing estimation of RTO consistent with embodiments.

The flowchart in FIG. 11 illustrates an exemplary embodiment for determining the RTO considered in embodiments. In FIG. 11, after a starting point 1102, at 1104 the next un-processed subcarrier may be determined. At 1106, for subcarrier k, and its pair N-k, the LS estimate of the channel at these carriers may be obtained. At 1108, the product $\hat{H}_k^* \hat{H}_{N-k}$ may be formed. At 1110, the phase of the resulting complex number may be divided by $2\pi$ to obtain the RTO for that carrier pair. At 1112, determine if all carrier pairs are processed, and if no return to 1104. If yes then at 1114, an average RTO may be computed for each carrier pair to obtain the final estimate of the RTO for output at 1116. Variations of this embodiment are also contemplated.

Embodiments contemplate that one or more channel estimators may include an actual channel estimation. This may be done by a LS channel estimator on one or more transmitted training symbols and may generate accurate channel estimates for at least the reason that the SFO and RTO may have been removed from the received signal distortion, for example, after SFO estimation and RTO estimation, respectively.

Without the presence of ICI, the OFDM channel, ignoring additive noise, may behave as N parallel channel of the form $Y_k = H_k^* X_k$. By transmitting one or more training symbols, the LS channel estimator may be applied to estimate the frequency domain response at some or each subcarrier frequency as shown in Equation (10):

$$\hat{H}_k = \frac{Y_k}{X_k} \quad \text{Equation (10)}$$

Embodiments contemplate that one or more additional procedures may be performed due to the Hermitian symmetry of the channel in order to improve the estimate. Since $H_k = H_{N-k}^*$, the N/4 estimated pairs $H_k$ and $H_{N-k}$ may be examined together to obtain an average magnitude and average phase. In some embodiments, only N/4 pairs may be available for estimation because the even subcarriers may not be loaded with training data, as they are set to zero in the ACO-OFDM transmitter as described previously. The average magnitude and phase may then be used to form the channel estimate such that the Hermitian symmetry property $H_k = H_{N-k}^*$ is maintained. Once the channel estimates are known, frequency domain equalization may be performed to compensate for the channel distortion during data transmission.

Figure 12:
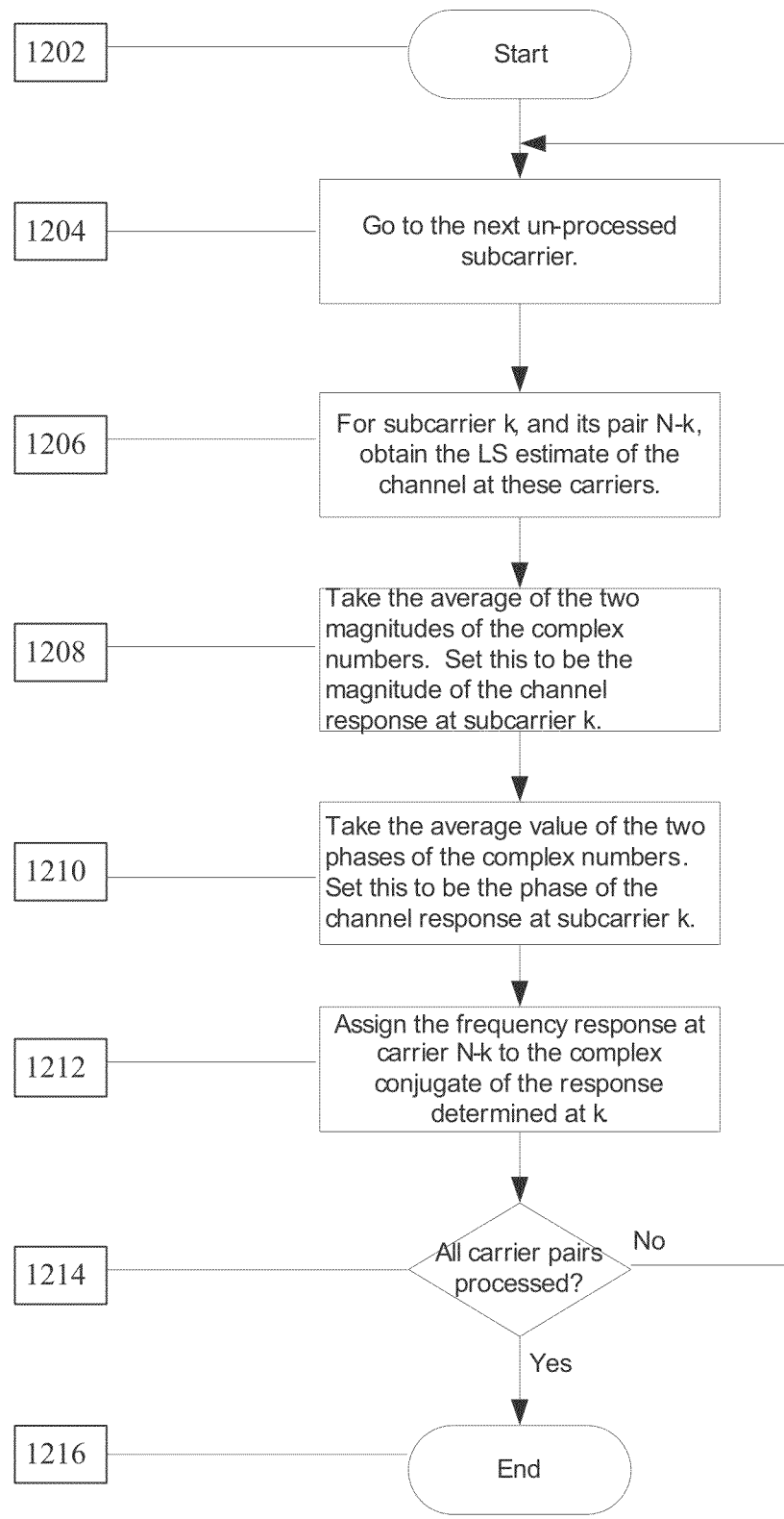
FIG. 12 illustrates an exemplary flow diagram showing an estimation of channel frequency response H consistent with embodiments.

The flowchart in FIG. 12 illustrates an exemplary embodiment for determining the channel frequency response considered in embodiments. In FIG. 12, after a starting point 1202, at 1204 the next un-processed subcarrier may be determined. At 1206, the average of the two magnitudes of the complex numbers may be determined and may be set to be the magnitude of the channel response at subcarrier k. At 1208, the average value of the two phases of the complex numbers may be determined and may be set to be the phase of the channel response at subcarrier k. At 1210, the frequency response at carrier N-k may be assigned to the complex conjugate of the response determined at k. At 1212, determine if all carrier pairs have been processed, and if no return to 1204. If yes then at 1214, the frequency response for all carriers may be considered to be determined Variations of this embodiment are also contemplated.

Figure 13:
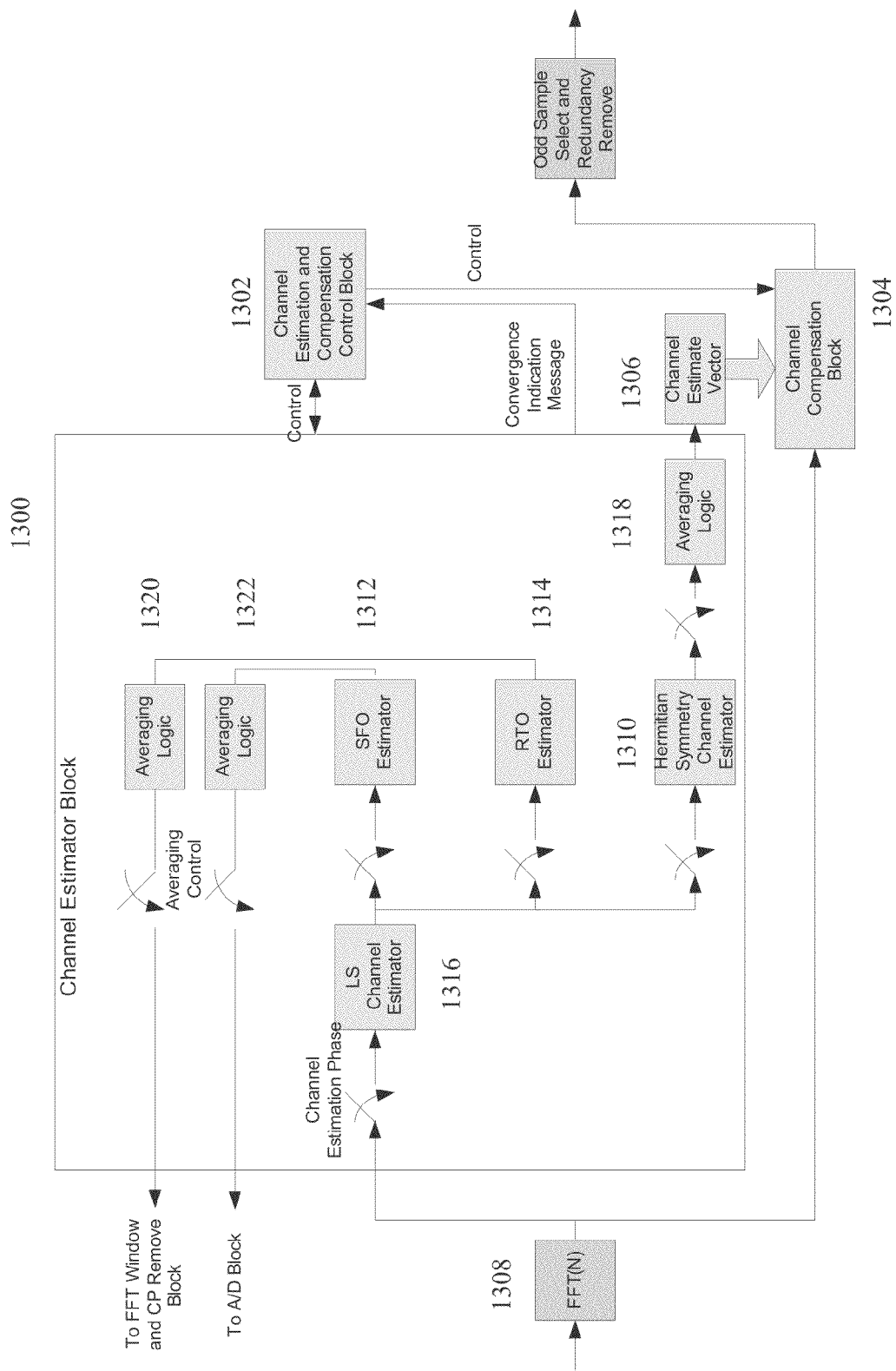
FIG. 13 illustrates exemplary details of channel estimation and compensation consistent with embodiments.

FIG. 13 illustrates an exemplary embodiment of the channel estimator described previously and exemplary channel estimation techniques. FIG. 13 may be considered as a detailed view of the channel estimation and compensation block illustrated in FIG. 2.

Referring to FIG. 13, an external control mechanism (the channel estimation and compensation control block 1302), may manage some or all of the switchable data paths shown in FIG. 13. The control mechanism 1302 may be comprised of a software or hardware entity that is part of the receiver equipment and may control the behavior of the channel estimation block 1300 and the channel compensation block 1304 and as a result, the A/D block (not shown) and the FFT Window and CP remove block (not shown) (e.g., through the feedback of the SFO and RTO respectively). Communication between the Channel Estimation and Compensation Control Block 1302, and the Channel Estimator Block 1300 and Channel Compensation Block 1304 may be achieved through control messages and convergence indication messages, for example.

The control message that may be sent by the channel estimation and compensation control block 1302 to one or more of the other blocks may contain information about which procedures of the channel estimation should currently be executed, and/or when the channel estimation should be turned off. The control message may also instruct the channel compensation block 1304 on how to apply the channel estimate vector 1306 to the received data during compensation. For example, the channel estimate applied may be a time average over the last x channel estimates, where x may be one or larger. The average may also involve an exponential forgetting factor, which may be transmitted to the channel compensation block 1304 through the control message. The forgetting factor could be applied to scale each value in the average in order for the average to be biased towards the more recent channel estimates and give less importance to the older channel estimates, for example. The convergence indication message sent by the channel compensation block 1304 may contain information about the change in the channel estimate over successive estimation phases, and may be used by the Channel Estimation and Compensation Control Block 1302 in order to change the amount of training data that may, and in some embodiments must, be sent over the link. As a result, the channel estimation phase may be executed periodically or as needed in order to update the SFO estimates, RTO estimates, and channel response estimates.

The Channel Estimation and Compensation Control Block 1302 may decide how often the channel estimation phase may take place. This information may be communicated to the transmitting STA through a reverse or feedback channel (not shown), for example. This reverse channel may take on one of multiple forms. It may be a higher layer (i.e., medium access control (MAC) or radio resource control (RRC)) logical channel that is used for control information exchange between the two communicating devices. It may also be a physical layer channel or entity, that may ensure a lower latency communication of this information. Embodiments contemplate at least two methods for negotiation of the training schedule and density between the transmitter and receiver. One may use a physical layer reverse channel for communicating the change in the channel estimation information, while the other may use control channel communication with a central entity.

During regular data transmission, the blocks involved in channel estimation may be disabled, and the control path for regular data transmission may be active, including the channel compensation block 1304. In this case, the frequency domain OFDM symbol, following application of the FFT 1308, may be compensated for frequency selective fading using the last updated channel estimate vector 1306. Although in this embodiment, the channel estimate vector 1306 may only be modified each time channel estimation using Hermitian symmetry 1310 is run, intermediate channel estimates or updates based on either decision feedback following error correction decoding or occasional pilot tones transmitted sparsely in the OFDM data symbol may also be used.

During the channel estimation phase, the control mechanism 1302 may individually enable SFO estimation 1312, RTO estimation 1314, and channel estimation using Hermitian Symmetry 1310, perhaps in some embodiments sequentially. In addition or alternatively, RTO estimation 1314, and channel estimation using Hermitian Symmetry 1310 may be run in parallel. The LS channel estimator 1316 may operate on each received OFDM symbol Y and generates a LS channel estimate H using knowledge of the training symbol X through Equation (10) applied to each OFDM subcarrier, for example.

During SFO estimation, the SFO estimator 1312 may output an estimated SFO using the latest LS channel estimates over two consecutive OFDM symbols. Once this SFO is generated, it may be used by the A/D block in FIG. 2 to change the sampling frequency so that it may match the transmitter sampling frequency and the SFO may be eliminated. Once the A/D has adjusted its sampling frequency, RTO estimation may be started. During RTO estimation, the RTO estimator 1314 may generate an estimate of the timing offset in samples using the RTO estimation procedure. Once the RTO has been estimated, the FFT Window and CP Remove block of FIG. 2 may adjust the FFT window by either advancing or delaying the window by a number of samples determined by the RTO estimator. Following this adjustment, any ICI may be eliminated as the FFT windows of the transmitter and receiver should be aligned, and channel estimation using Hermitian symmetry may be started. During channel estimation using Hermitian symmetry, the Hermitian Symmetry Channel Estimator 1310 may modify the latest LS channel estimates by averaging in 1318 the magnitudes and phases of the samples.

The Channel Estimation and Compensation Control block 1302 may also choose to run the full channel estimation (i.e., SFO estimation 1312, RTO estimation 1314, and channel estimation using Hermitian symmetry 1310) multiple times in immediate or staggered succession. After each iteration of the channel estimation, the final channel estimates may improve from the previous iteration until the improvement between iterations becomes negligible. The control mechanism 1302, if it is allowed to do so by the length of the training sequence, may perform the channel estimation procedure multiple times until a negligible change in the channel estimates may be observed. In addition or alternatively, embodiments contemplate that the control logic 1302 may also allow for a non-sequential execution of SFO estimation 1312, RTO estimation 1314, and channel estimation using Hermitian symmetry 1310, allowing for a non-optimal compensation of RTO, SFO and channel distortions, but in turn, simplifying the control. SFO estimation 1312, RTO estimation 1314, and channel estimation using Hermitian symmetry 1310 may all be run in parallel on the same set of subcarriers, or, they may be overlapped in terms of the duration of each estimation. The use of averaging logic for the compensation of each distortion may allow the estimator to make use of time-averaged results (via 1318, 1320, and 1322 for example) for each of the SFO, RTO, and channel estimates before applying them to the received signal, which may improve overall performance in different channel conditions or mobility scenarios.

Embodiments contemplate that the channel estimation techniques, such as the of SFO estimation, RTO estimation, and channel estimation using Hermitian symmetry, may be performed on a subcarrier-by-subcarrier basis, and may thus be implemented in both burst-mode systems (where the training data may be concentrated into the first few OFDM symbols of a burst) or continuous mode systems (where training data may be dispersed as pilots at specific carrier locations that may be known by the receiving STA). The frame structure and negotiation of the training data may differ based on whether the system is burst-mode or continuous-mode.

Embodiments contemplate that the behavior of each block in FIG. 13 may change based at least in part on whether burst-mode or continuous mode is being utilized. For example, when operating in burst mode, the SFO Estimator 1312, RTO Estimator 1314 and Hermitian Symmetry Channel Estimator 1310 may operate on the entire ACO-OFDM symbol and this may result in a modification of the entire channel estimate vector 1306. In continuous mode, those same blocks may operate on the subcarriers which carry pilots for the ACO-OFDM symbol being considered, and in some embodiments may operate only on the subcarriers which carry pilots for the ACO-OFDM symbol being considered. Channel estimates at subcarriers that may not carry training data can be performed by interpolation in time and frequency, in conjunction with the use of past estimates. As a result, in some embodiments, the blocks of FIG. 13, may change the channel estimates at the pilot subcarriers (and perhaps only the channel estimates at the pilot subcarriers), and other techniques (such as interpolation) may further refine the estimates at the other subcarriers. In the continuous mode, the frequency of RTO and/or SFO correction and the type of averaging applied in each case may be dependent, and in some embodiments perhaps highly dependent, on the control message sent by the Channel Estimation and Compensation Control Block 1302.

Embodiments contemplate that in continuous-mode OFDM systems (e.g., LTE), training data may be distributed throughout the data symbols via one or more pilot subcarriers in order to continuously track the channel estimates. In a dedicated link continuous mode system, a centralized entity may be responsible for defining the course timing of OFDM symbols by defining a time base to be followed by the transmitting and receiving STAs. Once this timing is established, communication may occur without the intervention of the centralized entity. One or more of the ACO-OFDM channel estimation techniques contemplated by embodiments may be realized for a continuous mode direct link system by having the transmitting STA ensure that two subsequent OFDM symbols, or two OFDM symbols which may be closely separated in time, have the pilots sent on the same subcarrier. Embodiments also contemplate that pilot subcarriers may also occur in conjugate pairs. This may enable the use of any of the three estimations: SFO estimation; RTO estimation; and channel estimation using Hermitian symmetry, to be applied specifically to that subcarrier, and in some embodiments to that subcarrier alone, through the application of Equation (8), Equation (9), and/or Equation (10) on the subcarrier where the pilot was transmitted.

Figure 14:
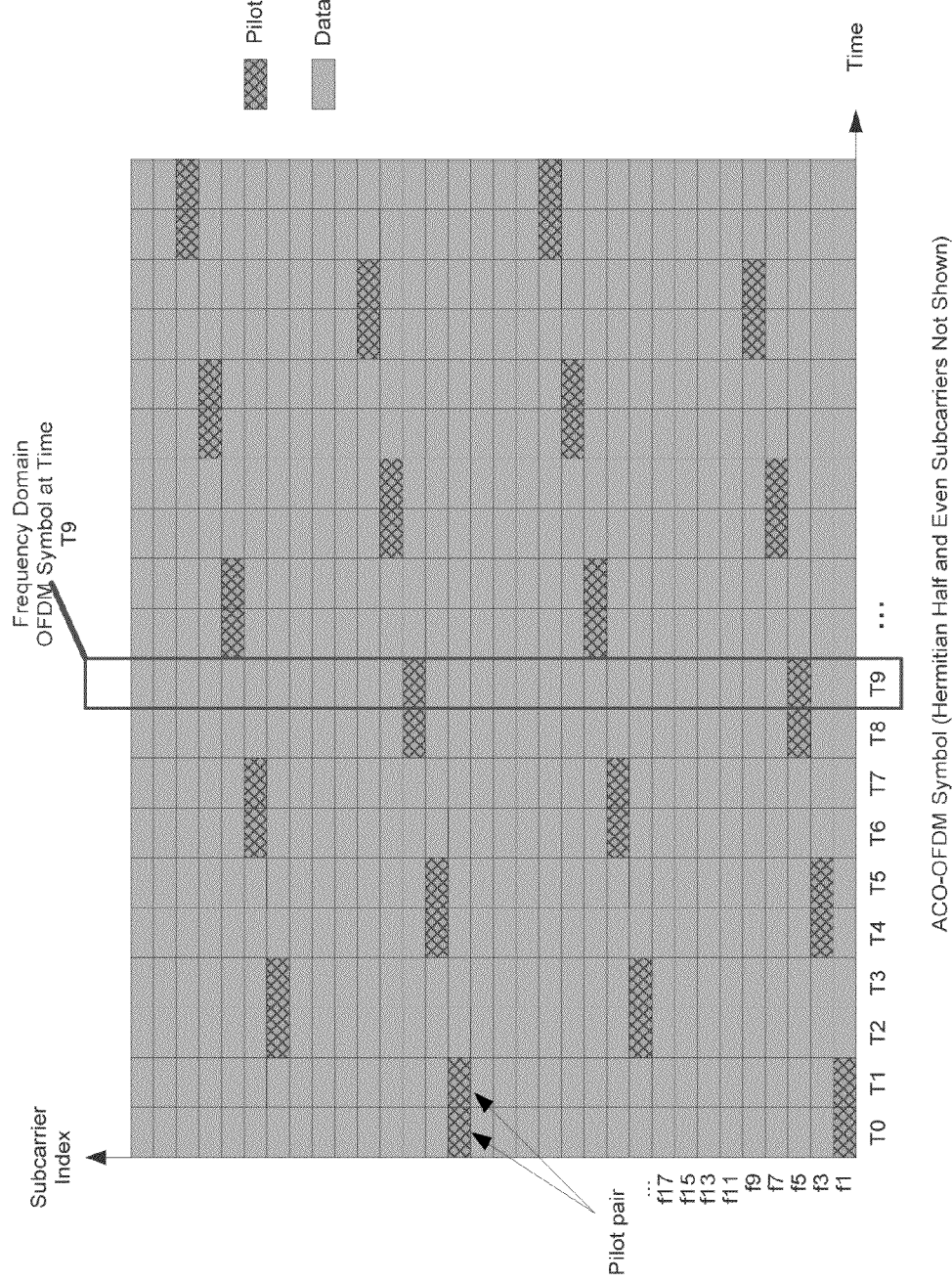
FIG. 14 illustrates exemplary placement of pilot subcarriers for a continuous mode ACO-OFDM consistent with embodiments.

FIG. 14 illustrates an exemplary distribution of pilots for a continuous mode ACO-OFDM contemplated by embodiments. Embodiments contemplate that the paired OFDM symbols, although shown as consecutive in the example of FIG. 14, may be separated in time by a delay which may known to both the transmitter and receiver. Consecutive pilot symbol pairs may result in a lower implementation complexity for the receiver. However, a separation of w symbols between the pilots in a pair may be used to mitigate time-variant fading which may affect the channel estimates on specific subcarriers. As described previously, in order for RTO estimation and/or channel estimation using Hermitian symmetry to be used, a particular subcarrier and its conjugate pair may both be pilot samples, and in some embodiment will both be pilot pairs. Location of pilots may change in time, as seen in FIG. 14. In order for a channel estimate to be obtained for at least one or every subcarrier in the continuous mode, the estimation scheme may ensure that pilots are eventually transmitted on every subcarrier, or the estimation scheme may transmit pilots for a certain set of subcarriers, and in some embodiments only for a certain set of subcarriers, and may rely on interpolation methods to obtain the channel estimate for the remaining subcarriers.

Embodiments contemplate that a high degree of accuracy or perhaps maximum accuracy of channel estimation while limiting the loss of efficiency inherent in training and pilot data may be achieved by using a dynamic physical layer training system. The receiver may determine the need for more accurate channel estimation and may communicate this to the transmitter in order to increase the amount of training symbols. By way of example, the amount of training data may be increased in situations where the data link conditions are poor, or when the channel is rapidly changing, among other reasons. When the link may be improved, or the channel may be quasi-static, the amount of training data may be decreased in order to increase the data efficiency of the link during such periods. Although the decision to increase or decrease the amount of training data may be made by the receiver of the link in some embodiments, the transmitter may also make this decision if, for example, channel quality indications may be regularly sent to the transmitter using the reverse channel.

In the continuous-mode embodiments, communicating the increase, decrease, or the change of placement of pilot data between the transmitter and receiver may be achieved through the use of a physical layer automatic repeat request (ARQ) mechanism. Embodiments contemplate that by using an ARQ mechanism, the receiver may acknowledge the receipt of each physical layer frame with, for example, a positive acknowledgement (ACK) frame or a negative acknowledgement (NACK) frame. For example, the ACK and/or NACK frames may contain a field which may instruct the transmitter to modify the amount and/or placement of the pilot subcarriers, in the case of continuous-mode systems; or, to change the length of the training sequence, in the case of burst-mode systems. The relative power of the training data may also be controlled by this same method of feedback via the ACK or NACK.

Embodiments contemplate that using a physical layer ARQ for enabling dynamic adjustment of the training data may improve the performance of the receiver for at least the reason that the receiver is allowed to perform soft-symbol combining or repetition of incorrectly received frames while presenting a method for the receiver to evaluate the speed of the variation of the channel which may be needed to decide the required training density for that particular channel. Further, the actual ACK/NACK sent by the receiver back to the transmitter may be used as the communication scheme to modify the training schedule or density. The feedback channel used to transmit the ACK/NACK may be on a different frequency for RF ACO-OFDM systems, or wavelength for optical ACO-OFDM systems, to ensure high reliability of the message and/or lower the chance of data interference affecting the feedback. Embodiments contemplate that the subcarrier orthogonality may be exploited to ensure ACK/NACK reliability, and the ACK/NACK may be sent using a specific ACO-OFDM symbol within the physical layer frame structure.

Embodiments also contemplate that, for continuous mode systems, transmission may begin with a default schedule and density of the pilots such as, for example, the one shown in FIG. 14. For a terminal which may not support the physical layer ARQ, the default pilot schedule and density may be maintained for communication to such a terminal. The physical layer ARQ scheme may not require regular acknowledgements, in contrast to traditional MAC-layer ARQ schemes, since the flow control function may be handled by the MAC layer instead, thus allowing this feature to be implemented in alternative embodiments. The transmitting system may simply respond to a NACK that it may receive by retransmitting starting at the identified physical layer frame.

Figure 15:
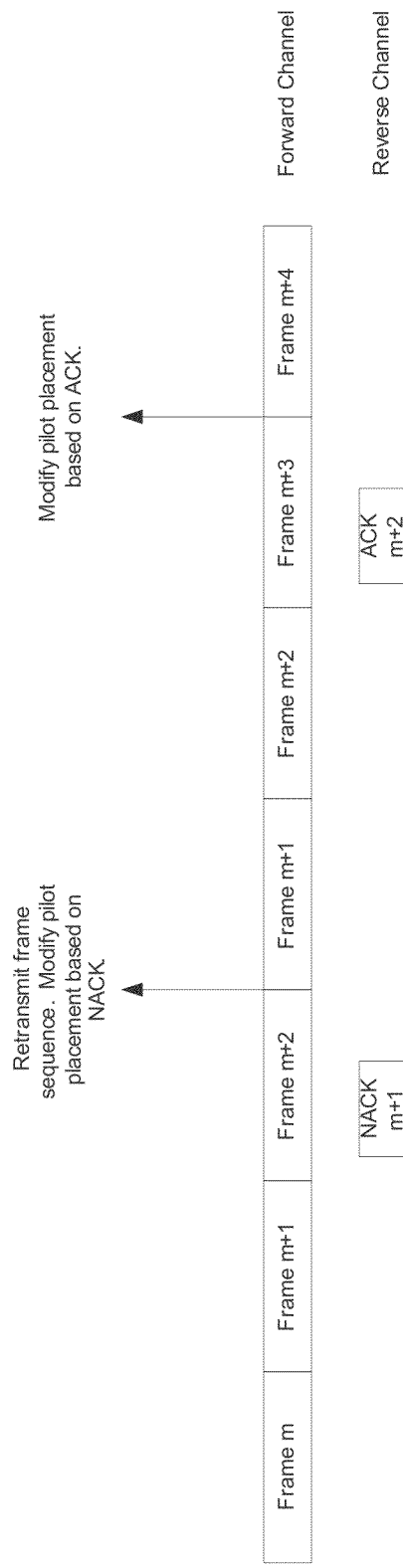
FIG. 15 illustrates an exemplary physical layer ARQ scheme for dynamic pilot placement in continuous mode ACO-OFDM consistent with embodiments.

Embodiments contemplate that the ACKs and NACKs may both allow changing the pilot symbol placement. FIG. 15 illustrates in the logical diagram of an exemplary physical layer ARQ scheme. In FIG. 15, the forward channel may represent the channel from the transmitter to the receiver and the reverse channel may represent the feedback channel, which may be used for ACK/NACK. The ACK/NACK messages may contain a frame number associated with the ACK/NACK as well as pilot placement information which may take effect on the next frame. Information about the transmit power to be used on the pilot subcarriers may also be sent. In order to incorporate the ACK/NACK message into the ACO-OFDM frame structure, a specific ACO-OFDM symbol may be reserved for the ACK/NACK. This reservation may allow the reverse channel to be merged with actual data transmission and may create a bidirectional dedicated link between two end systems. Such two end systems may each apply a physical layer ARQ scheme on the other entity's transmitted data.

Embodiments contemplate that the number of carriers that may be used for the ACK/NACK message may be kept to a minimum by using predetermined patterns and associating an integer number in the ACK/NACK message with each or some predetermined patterns. Apart from two reserved values which may represent the command to not change the current pilot placement, which for example may be indicated by zero, and the command to transmit ACO-OFDM symbols with pilots and perhaps only with pilots, which for example may be indicated by one, each integer value may represent a particular predetermined pattern of pilot placement. Embodiments contemplate that predetermined patterns of pilot placements may also vary in terms of pilot density. For example, in the case of a fast-fading channel, a pilot pattern with a high density of pilot subcarriers may be chosen. Embodiments further contemplate that a y-bit message may be included in the ACK/NACK message that may indicate the desired power of the subcarriers to be used starting, for example, in the next frame. The y bits may specify an increment/decrement operation in order to reduce the number of bits required for pilot power adjustment, and in some embodiments only in order to reduce the number of bits required for pilot power adjustment.

Figure 16:
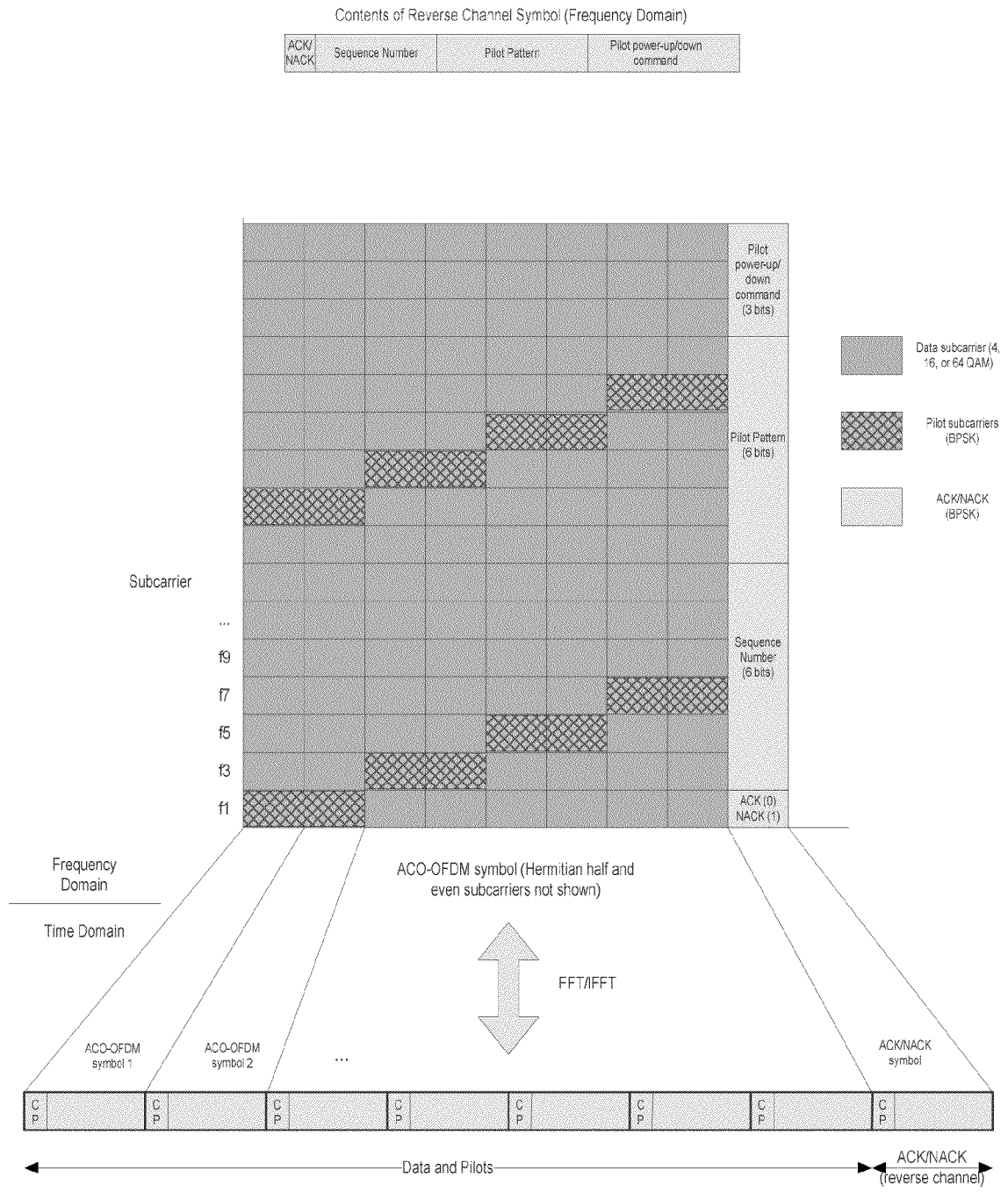
FIG. 16 illustrates an exemplary physical layer ARQ Scheme for dynamic pilot placement in continuous mode ACO-OFDM consistent with embodiments.

FIG. 16 illustrates an exemplary placement of the ACK/NACK message in an ACO-OFDM frame in frequency domain. The example of FIG. 16 assumes a value of N being 64 and a total of 9 OFDM symbols in each frame physical layer frame—by way of example and not limitation. Different values for N and/or the frame size are contemplated and may be employed to implement the dynamic pilot adjustment scheme described previously without loss of generality. The ACK/NACK may be embedded with regular data which may also be transmitted in the feedback channel in order to allow bidirectional communication as discussed previously. Because ACO-OFDM is being used, the Hermitian subcarriers are not shown, and the even subcarriers, which is some embodiments must be set to 0, are also not shown. Binary Phase Shift Keying (BPSK) may be employed on the subcarriers used for the ACK/NACK to ensure high-reliability demodulation of this message.

The scheme illustrated in FIG. 16 may be extended to a system with a one-to-many link that may be typical of a link between a central node and multiple client nodes, where the communication between the central station and the client nodes may be scheduled through the allocation of resources. LTE may be an example of such a system which may utilize regular OFDM. A resource element for each client node may, for example, include 9 consecutive ACO-OFDM symbols transmitted by the central station and a subset of the subcarriers on those 9 symbols.

Embodiments contemplate that the ACK/NACK sequence number, pilot pattern, and/or pilot power-up/down command located within the downlink resource element may be associated to the uplink data transmission to the central station for a particular node in question. Embodiments contemplate that the uplink frames may contain the suggested pilot pattern and pilot power-up/down command that may be used by the central node when transmitting pilots to the client node. In such embodiments, the pattern received by the central node from a particular client's ACK/NACK applies to the subcarriers that may be used to transmit to that client (based on the allocated resource element) and in some embodiments may apply only to the subcarriers that may be used to transmit to that client (based on the allocated resource element).

Embodiments contemplate that, in burst-mode systems, the transmitting and receiving STAs may depend on a central node for establishment and maintenance of the direct link, but may not rely on the central node for timing. Timing of the direct link may be established at least partially or entirely through the synchronization sequence, which may include coarse timing synchronization that may be followed by channel estimation and/or fine timing synchronization. At least one role of the central node may be to determine the wavelengths for optical ACO-OFDM, or frequency sub-bands for RF-based ACO-OFDM, which should be utilized by the link. The central node may also determine the training sequence length and type that may be used in each burst. In order to maintain the maximum amount of channel efficiency, the length of the training sequence to be used for the direct link may be modified based, at least in part, on the link quality, which may be periodically sent to the central node by the receiving STA.

Figure 17:
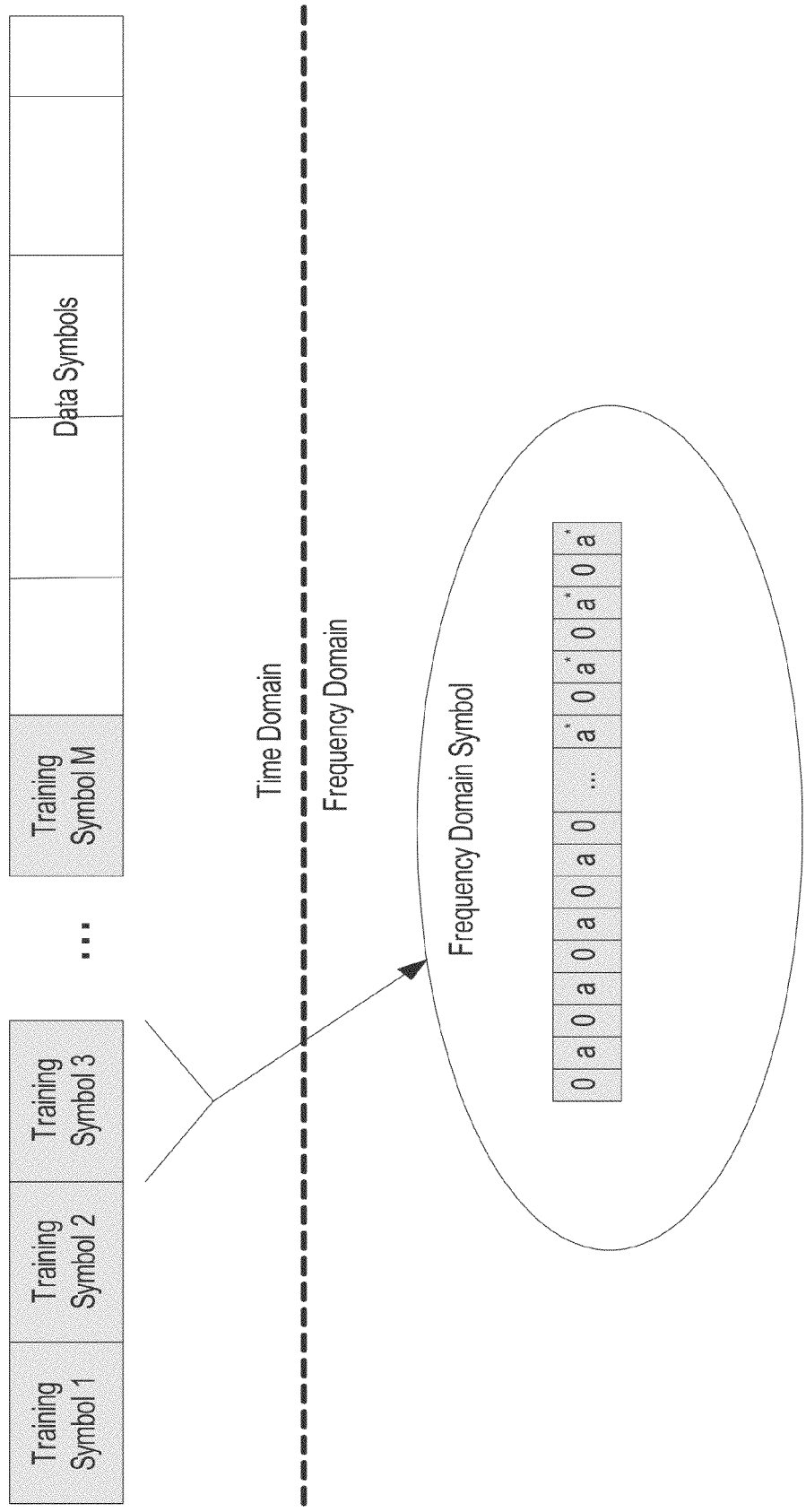
FIG. 17 illustrates an exemplary burst mode symbol structure with training sequence consistent with embodiments.

FIG. 17 illustrates an exemplary frame structure that may be used by an ACO-OFDM system which may operate the channel estimator in the burst-mode version of the embodiments described previously. The frame structure may include a number M of successive OFDM training symbols. M is the number of consecutive training symbols that may be transmitted at the beginning of each OFDM burst. The number of training symbols may be identical and known to the receiver ahead of time. Perhaps because each of the OFDM symbols may or must be a valid ACO-OFDM symbol, Hermitian symmetry and even-sample zeroing may be respected. The symbol shown corresponds to its format just prior to the IFFT(N) block of FIG. 2. In addition to the frame structure shown in FIG. 17, embodiments contemplate that the training symbols may be separated in time, with data symbols interspaced between them as well. This spacing, in general, may depend on the quality of the channel estimates as may be perceived by the receiver. This quality may be determined, for example, by the physical layer error-correction decoder based, at least in part, on the number of bits detected in error, and/or the distance between the received symbols and one or more decision symbols that may be generated by the decoder.

Embodiments contemplate that the length M of the training sequence may contain at least four training symbols, which in some embodiments may be enough to perform the estimation in a single sequential iteration of SFO estimation, RTO estimation, and channel estimation using Hermitian symmetry. Embodiments contemplate that the value of M may be longer for techniques such as, by way of example and not limitation, an iterative application of the channel estimator.

Embodiments contemplate that the value of M may be first communicated to the transmitting and receiving STA by the central node during link establishment, which may be achieved, for example, through the use of low-bandwidth dedicated control channels. In some embodiments, the control channels may be RF channels and may use a different air interface than the dedicated link.

Figure 18:
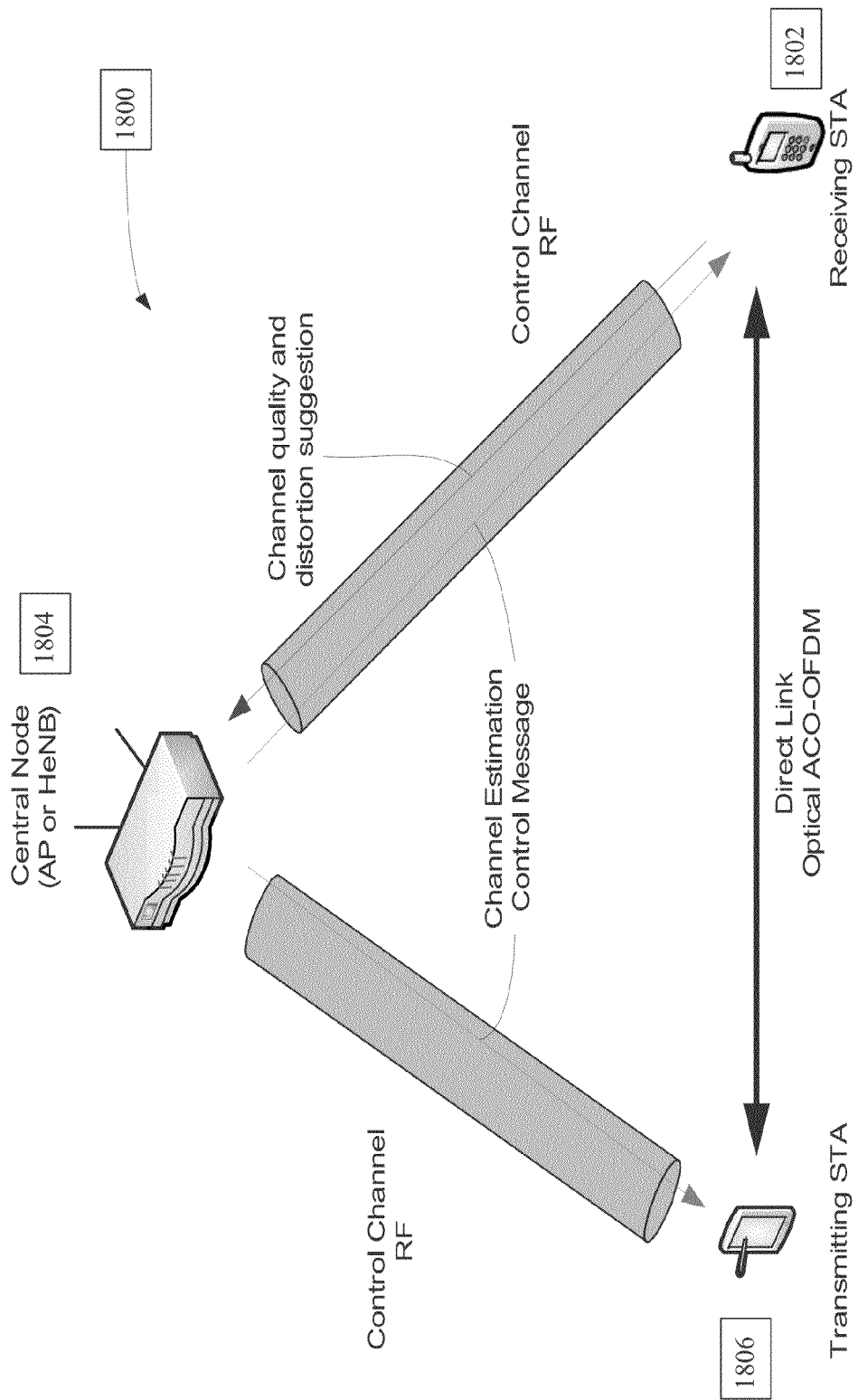
FIG. 18 illustrates an exemplary architecture for dynamic training sequence establishment in burst mode ACO-OFDM consistent with embodiments.

FIG. 18 illustrate an architecture 1800 contemplate by embodiments for dynamic training sequence establishment in burst mode ACO-OFDM. An agreed upon value may first be employed during the first burst of data transmission. After each burst, a receiving STA 1802 may send information about the channel quality and/or error rate experienced during the data burst. Based at least in part on the channel quality, the central node 1804 may instruct the transmitting STA 1806 and receiving STA 1802 of an increase or decrease of the length of the training sequence that may be used in the subsequent burst. The training symbol type, the data pattern used in the actual training symbol, and/or the separation between the repeated symbols may also be modified in this way. An indexing of a list of known training symbols, similar to the indexing scheme for the pilot placement pattern in continuous mode systems, may be maintained by the central node 1804. Embodiments contemplate that, based at least in part on the error rate and/or channel quality on the link, the receiving STA 1802 may send a suggestion to the central node 1804 as to the type of distortion that may likely be causing the errors (e.g., channel fading, RTO, SFO). The central node 1804 may send a channel estimation control message to the two STAs 1802, 1806 involved in the direct link notifying them of the change in the training sequence length. The transmitting STA 1806 may use the newly instructed training sequence length and/or type in the next burst that it sends.

Figure 19:
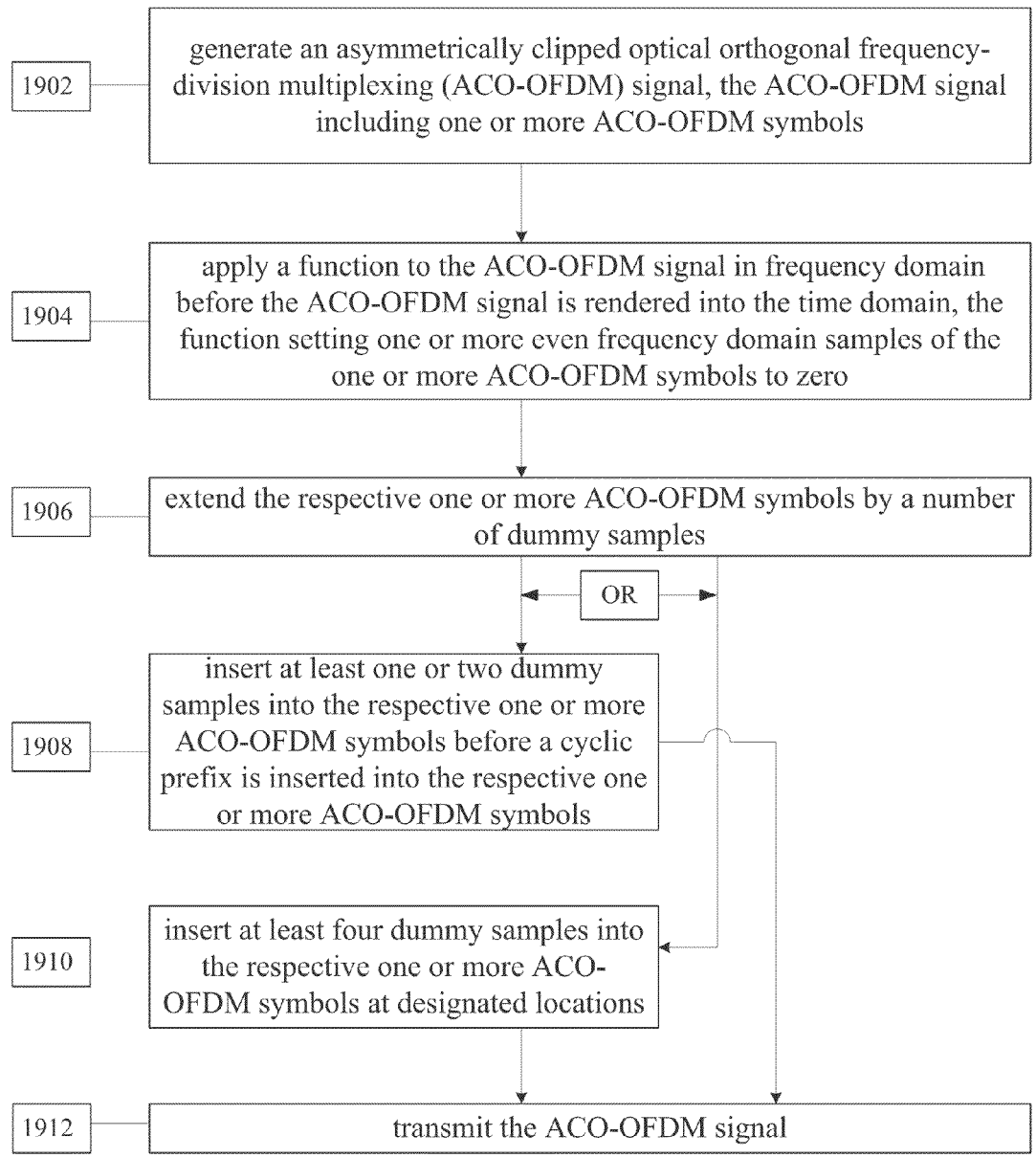
FIG. 19 illustrates an exemplary ACO-OFDM signal transmission process consistent with embodiments.

In view of the previously disclosed subject matter and referring to FIG. 19, embodiments contemplate that, at 1902, a wireless transmit/receive unit (WTRU), such as a WTRU described in FIG. 1B, may be configured, at least in part, to generate an asymmetrically clipped optical orthogonal frequency-division multiplexing (ACO-OFDM) signal. Additionally or alternatively, embodiments contemplate that the ACO-OFDM signal may include one or more ACO-OFDM symbols and the ACO-OFDM signal may be generated without, or absent, either a pilot or a training sequence.

Additionally or alternatively, embodiments contemplate that, at 1904, the WTRU may be further configured to apply a function to the ACO-OFDM signal in frequency domain before the ACO-OFDM signal is rendered into the time domain. Embodiments contemplate that the function may set one or more even frequency domain samples of the one or more ACO-OFDM symbols to zero. Embodiments also contemplate that the function may be an even sample zero insert.

Additionally or alternatively, at 1906, the WTRU may be further configured to extend the respective one or more ACO-OFDM symbols by a number of dummy samples. Additionally or alternatively, embodiments contemplate that the number of dummy samples may be at least one or two. Embodiments contemplate that, at 1908, the WTRU may further configured to insert at least one or two dummy samples into the respective one or more ACO-OFDM symbols before a cyclic prefix is inserted into the respective one or more ACO-OFDM symbols. Embodiments contemplate that the inserted one or two dummy samples may be adjacent to the cyclic prefix in the respective one or more ACO-OFDM symbols.

Alternatively, embodiments contemplate that the number of dummy samples may be at least four, and at 1910, the WTRU may be configured to insert the at least four dummy samples into the respective one or more ACO-OFDM symbols at designated locations.

Alternatively or additionally, at 1912, the WTRU may be further configured to transmit the ACO-OFDM signal. Embodiments contemplate that the ACO-OFDM signal may be transmitted in time domain.

Figure 20:
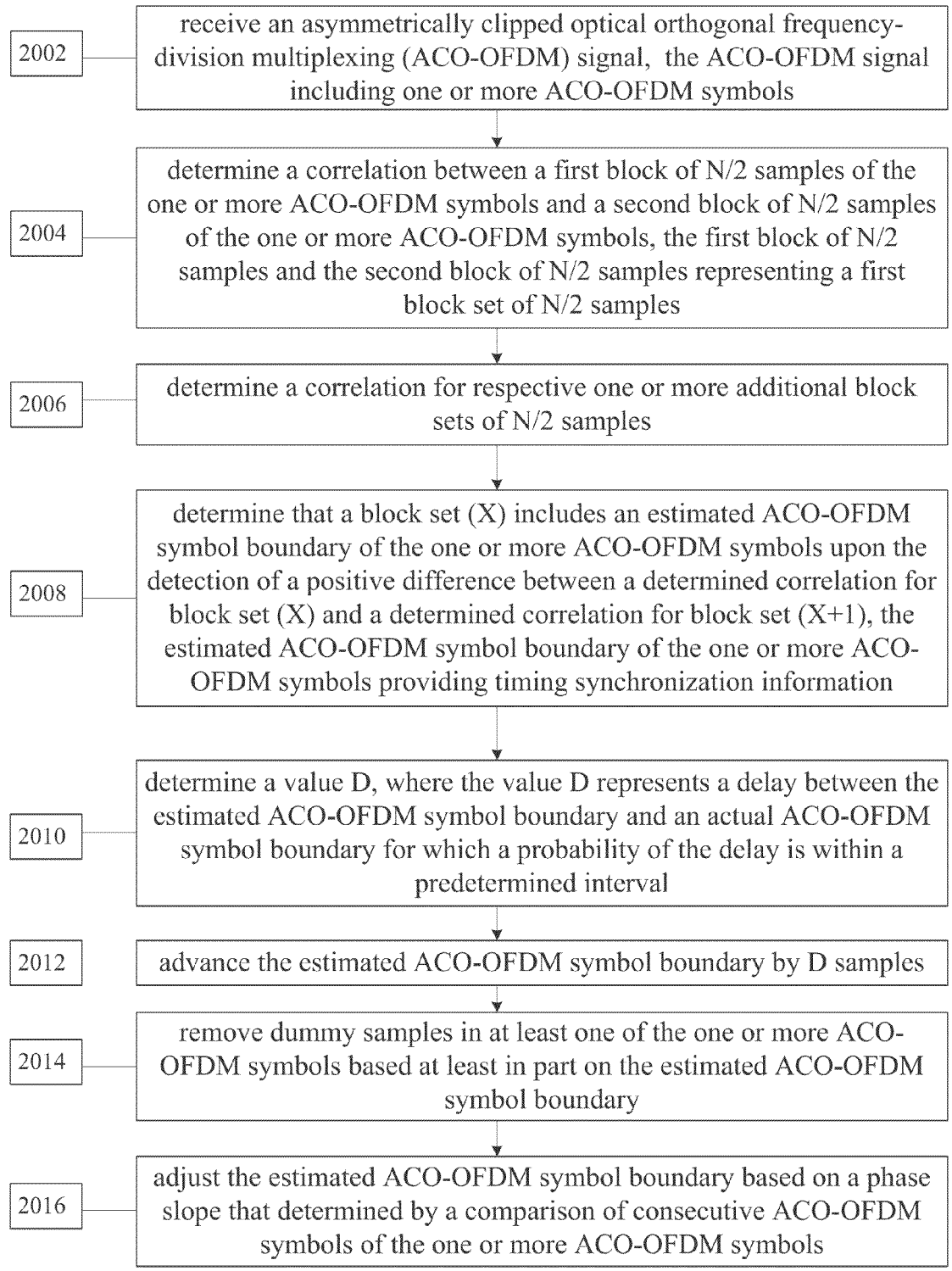
FIG. 20 illustrates an exemplary ACO-OFDM signal synchronization process consistent with embodiments.

Referring to FIG. 20, embodiments contemplate a wireless transmit/receive unit (WTRU) that may, at 2002, be configured at least in part to receive an asymmetrically clipped optical orthogonal frequency-division multiplexing (ACO-OFDM) signal. Additionally or alternatively, the ACO-OFDM signal may include one or more ACO-OFDM symbols and the ACO-OFDM signal may be generated without, or absent, either a pilot or a training sequence.

Alternatively or additionally, embodiments contemplate that, at 2004, the WTRU may be further configured to determine a correlation between a first block of N/2 samples of the one or more ACO-OFDM symbols and a second block of N/2 samples of the one or more ACO-OFDM symbols. Embodiments contemplate that the first block of N/2 samples and the second block of N/2 samples may represent a first block set of N/2 samples where N may be an integer representing a number of samples of the one or more ACO-OFDM symbols.

Alternatively or additionally, embodiments contemplate that the correlation may determine that the first block set of N/2 samples may include an estimated boundary of the one or more ACO-OFDM symbols upon the detection of a minimum between the first block of N/2 samples and the second block of N/2 samples. Embodiments contemplate that the estimated boundary of the one or more ACO-OFDM symbols may provide the WTRU with timing synchronization information.

Alternatively or additionally, embodiments contemplate that the first block set of N/2 samples and one or more respective additional block sets of N/2 samples may be respectively represented as block set (X), where X is an integer, and X=1 may represent the first block set of N/2 samples, and subsequent values of X may be indexed respectively to the one or more additional block sets of N/2 samples.

Alternatively or additionally, embodiments contemplate that, at 2006, the WTRU may be further configured to determine a correlation for the respective one or more additional block sets of N/2 samples. Additionally, at 2008, the WTRU may be configured to determine that block set (X) may include an estimated ACO-OFDM symbol boundary of the one or more ACO-OFDM symbols upon the detection of a positive difference between the determined correlation for block set (X) and the determined correlation for block set (X+1). Embodiments contemplate that the estimated ACO-OFDM symbol boundary of the one or more ACO-OFDM symbols may provide the WTRU with timing synchronization information.

Alternatively or additionally, embodiments contemplate that, at 2010, the WTRU may be further configured to determine a value D, where the value D may represent a delay between the estimated ACO-OFDM symbol boundary and an actual ACO-OFDM symbol boundary for which a probability of the delay may be within a predetermined interval. Alternatively or additionally, embodiments contemplate that, at 2012, the WTRU may be configured to advance the estimated ACO-OFDM symbol boundary by D samples.

Alternatively or additionally, embodiments contemplate that WTRU the one or more ACO-OFDM symbols may have been respectively extended by a number of dummy samples. Embodiments contemplate that the dummy samples may reduce a difference between an expected ACO-OFDM symbol timing location and an increase in the determined correlations.

Alternatively or additionally, embodiments contemplate that, at 2014, the WTRU may be further configured to remove the dummy samples in at least one of the one or more ACO-OFDM symbols based at least in part on the estimated ACO-OFDM symbol boundary.

Alternatively or additionally, embodiments contemplate that, at 2016, the WTRU may be further configured to adjust the estimated ACO-OFDM symbol boundary based on a phase slope that may be determined by a comparison of consecutive ACO-OFDM symbols of the one or more ACO-OFDM symbols.

Figure 21:
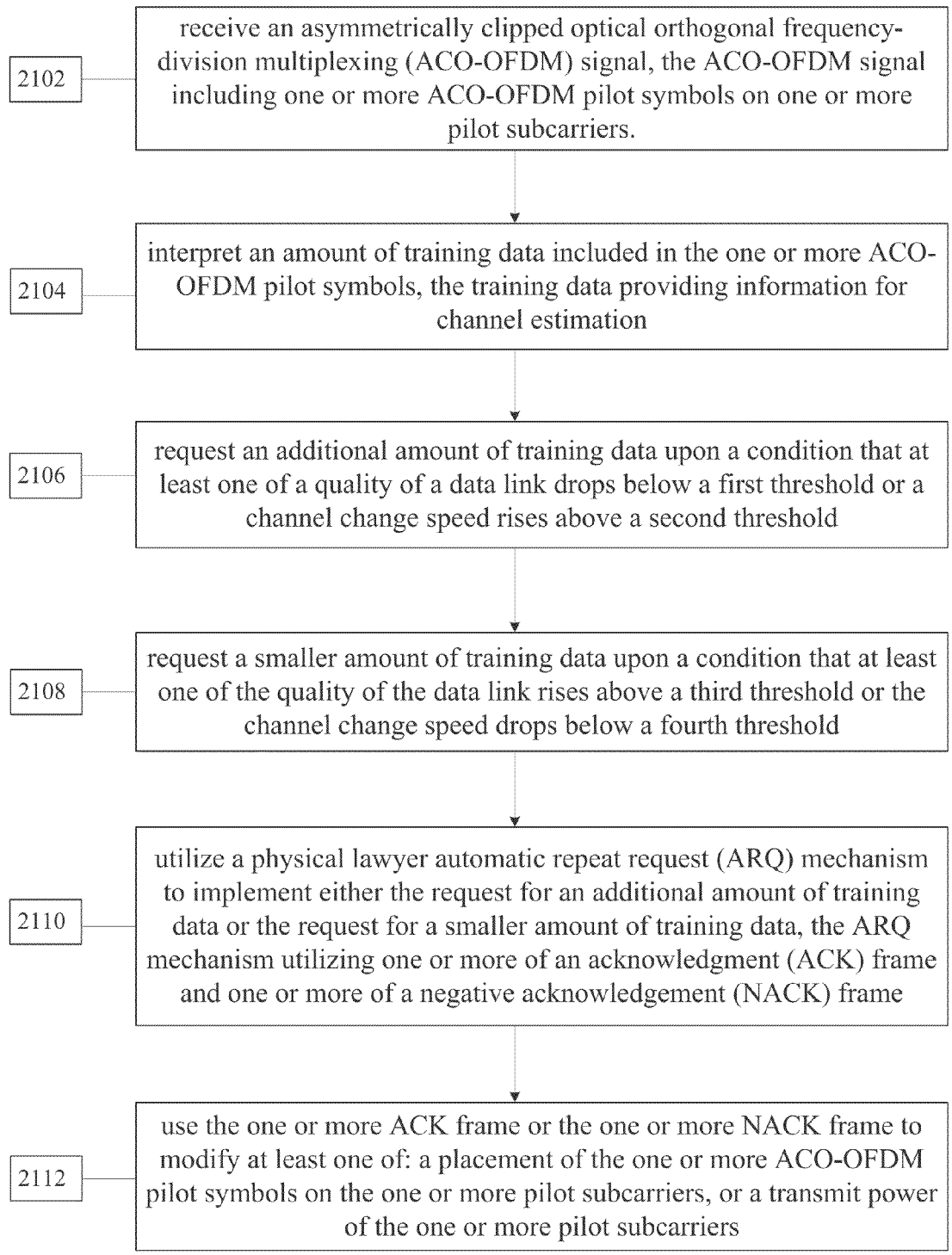
FIG. 21 illustrates an exemplary ACO-OFDM channel estimation process consistent with embodiments.

Referring to FIG. 21, embodiments contemplate that a wireless transmit/receive unit (WTRU) may, at 2102, be configured at least in part to receive an asymmetrically clipped optical orthogonal frequency-division multiplexing (ACO-OFDM) signal. Embodiments contemplate that the ACO-OFDM signal may include one or more ACO-OFDM pilot symbols on one or more pilot subcarriers.

Alternatively or additionally, embodiments contemplate that, at 2104, the WTRU may be further configured to interpret an amount of training data that may be included in the one or more ACO-OFDM pilot symbols. Embodiments contemplate that the training data may provide information for channel estimation.

Alternatively or additionally, the WTRU may, at 2106, be further configured to request an additional amount of training data upon a condition that at least one of a quality of a data link drops below a first threshold or a channel change speed rises above a second threshold. Alternatively or additionally, the WTRI may, at 2108, be further configured to request a smaller amount of training data upon a condition that at least one of the quality of the data link rises above a third threshold or the channel change speed drops below a fourth threshold.

Embodiments contemplate that one or more of the first to fourth thresholds may be predetermined thresholds. Embodiments also contemplate that any of the first through fourth thresholds may be updated by the WTRU based on criteria established by the WTRU or perhaps based on information communicated to the WTRU from another network node, such another WTRU, a base station, or an eNodeB, for example.

Alternatively or additionally, embodiments contemplate that the WTRU may, 2110, be further configured to utilize a physical lawyer automatic repeat request (ARQ) mechanism to implement either the request for an additional amount of training data or the request for a smaller amount of training data. Embodiments contemplate that the ARQ mechanism may utilize one or more of an acknowledgment (ACK) frame and one or more of a negative acknowledgement (NACK) frame.

Alternatively or additionally, embodiments contemplate that the WTRU may, at 2112, be further configured to use the one or more ACK frame or the one or more NACK frame to modify at least one of: a placement of the one or more ACO-OFDM pilot symbols on the one or more pilot subcarriers, or a transmit power of the one or more pilot subcarriers.

Alternatively, embodiments contemplate that the ACO-OFDM signal may include at least two ACO-OFDM pilot symbols, where the at least two ACO-OFDM pilot symbols may be located consecutively on one of the one or more pilot subcarriers. Alternatively, the at least two ACO-OFDM pilot symbols may be located on one of the one or more pilot subcarriers and the at least two ACO-OFDM pilot symbols may be separated by a number of other symbols on the one of the one or more pilot subcarriers.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A wireless transmit/receive unit (WTRU), configured at least in part to:
   receive an asymmetrically clipped optical orthogonal frequency-division multiplexing (ACO-OFDM) signal, the ACO-OFDM signal including one or more ACO-OFDM symbols and the ACO-OFDM signal being generated absent either a pilot or a training sequence; and
   determine a correlation between a first block of N/2 samples of the one or more ACO-OFDM symbols and a second block of N/2 samples of the one or more ACO-OFDM symbols, the first block of N/2 samples and the second block of N/2 samples representing a first block set of N/2 samples, N being an integer representing a number of samples of the one or more ACO-OFDM symbols.

2. The WTRU of claim 1, wherein the correlation determines that the first block set of N/2 samples includes an estimated boundary of the one or more ACO-OFDM symbols upon a detection of a minimum between the first block of N/2 samples and the second block of N/2 samples, the estimated boundary of the one or more ACO-OFDM symbols providing the WTRU with timing synchronization information.

3. The WTRU of claim 1, wherein the first block set of N/2 samples and one or more respective additional block sets of N/2 samples are respectively represented as block set (X), where X is an integer, and X=1 represents the first block set of N/2 samples, and subsequent values of X are indexed respectively to the one or more additional block sets of N/2 samples, and the WTRU is further configured to:
   determine a correlation for the respective one or more additional block sets of N/2 samples; and
   determine that block set (X) includes an estimated ACO-OFDM symbol boundary of the one or more ACO-OFDM symbols upon a detection of a positive difference between a determined correlation for block set (X) and a determined correlation for block set (X+1), the estimated ACO-OFDM symbol boundary of the one or more ACO-OFDM symbols providing the WTRU with timing synchronization information.

4. The WTRU of claim 3, wherein the WTRU is further configured to:
   determine a value D, the value D representing a delay between the estimated ACO-OFDM symbol boundary and an actual ACO-OFDM symbol boundary for which a probability of the delay is within a predetermined interval; and
   advance the estimated ACO-OFDM symbol boundary by D samples.

5. The WTRU of claim 3, wherein the one or more ACO-OFDM symbols had been respectively extended by a number of dummy samples, the number of dummy samples reducing a difference between an expected ACO-OFDM symbol timing location and an increase in the determined correlations.

6. The WTRU of claim 5, wherein the WTRU is further configured to remove the number of dummy samples in at least one of the one or more ACO-OFDM symbols based at least in part on the estimated ACO-OFDM symbol boundary.

7. The WTRU of claim 3, wherein the WTRU is further configured to adjust the estimated ACO-OFDM symbol boundary based on a phase slope determined by a comparison of consecutive ACO-OFDM symbols of the one or more ACO-OFDM symbols.

* * * * *